US012596720B2

(12) United States Patent (10) Patent No.: US 12,596,720 B2
Pena et al. (45) Date of Patent: Apr. 7, 2026

(54) ELECTRONIC CATEGORIZATION OF SUB-USERS OF A DATABASE FOR RECEIVING AN ELECTRONIC ACTION

(71) Applicant: Klaviyo, Inc., Boston, MA (US)

(72) Inventors: Manuel Ventero Pena, Cambridge, MA (US); Carola Leiva, Brookline, MA (US); Alex Riina, Cambridge, MA (US); Stanley Wu, Chicago, IL (US); Robert Huselid, Stamford, CT (US); Annika Sougstad, Boston, MA (US); Alexandra Holness, Framingham, MA (US); Jordan Cora Chase, Salem, MA (US); Christopher Fox, Westport, CT (US); Jingwen Wu, Somerville, MA (US); Xiao Liu, Orinda, CA (US); Timothy Tadros, Boston, MA (US); Nicolas Asnes, Cohasset, MA (US); Elliot Penson, Braintree, MA (US); Dillon Jones, Medford, MA (US)

(73) Assignee: Klaviyo, Inc., Boston, MA (US)

( * ) Notice: Subject to any disclaimer, the term of this patent is extended or adjusted under 35 U.S.C. 154(b) by 0 days.

(21) Appl. No.: 18/815,993

(22) Filed: Aug. 27, 2024

(65) Prior Publication Data

US 2026/0064694 A1 Mar. 5, 2026

(51) Int. Cl.
G06F 16/2457 (2019.01)
G06F 16/2452 (2019.01)
(52) U.S. Cl.
CPC ...... G06F 16/2457 (2019.01); G06F 16/2452 (2019.01)

(58) Field of Classification Search
CPC .......................... G06F 16/2457; G06F 16/2452
See application file for complete search history.

(56) References Cited

U.S. PATENT DOCUMENTS 6,424,997 B1 7/2002 Buskirk
7,120,629 B1 10/2006 Seibel et al.
(Continued)

OTHER PUBLICATIONS

Simon, Customer segmentation: Definition, benefits, & methods, pp. 1-10, Mar. 7, 2024.*

(Continued)

*Primary Examiner* — Albert M Phillips, III
(74) *Attorney, Agent, or Firm* — Brian R. Short

(57) ABSTRACT

Apparatuses, methods, and systems for electronic categorization of sub-users of a database for receiving an electronic action are disclosed. One method includes receiving a segmentation description from a user of a user server, retrieving user data from the database, translating the segmentation description to a standardized segmentation system vernacular based on the segmentation description and the retrieved user data, identifying a set of individual criteria contained within the standardized segmentation description vernacular mapped to variable names, expressing the standardized segmentation system vernacular as a logical statement in terms of the variable names, parsing each individual criteria of the set of individual criteria against sub-user data of the database in parallel yielding a representation of each criteria, identifying sub-users of a segment by logically combine the representation of each criteria according to the logical statement, and performing an electronic action directed to the sub-users identified by the segment.

20 Claims, 14 Drawing Sheets

(56) References Cited

U.S. PATENT DOCUMENTS

| | | | |
|---|---|---|---|
| 7,765,222 | B2 | 7/2010 | Styles et al. |
| 7,991,800 | B2 | 8/2011 | Lawrence et al. |
| 8,200,612 | B2 | 6/2012 | Soylemez et al. |
| 8,463,736 | B2 | 6/2013 | Bakalash et al. |
| 8,751,327 | B2 | 6/2014 | Park et al. |
| 8,886,617 | B2 | 11/2014 | Grondin et al. |
| 9,350,867 | B2 | 5/2016 | Ristock et al. |
| 9,390,115 | B2 | 7/2016 | Liu et al. |
| 9,501,585 | B1 | 11/2016 | Gautam et al. |
| 9,558,238 | B2 | 1/2017 | Beutlburger et al. |
| 9,892,420 | B2 | 2/2018 | Sterns et al. |
| 10,176,222 | B2 | 1/2019 | Schneider et al. |
| 10,614,501 | B2 | 4/2020 | Fredrich et al. |
| 10,657,134 | B2 | 5/2020 | Gadodia et al. |
| 10,713,230 | B2 | 7/2020 | Weissman et al. |
| 10,728,200 | B2 | 7/2020 | Miller et al. |
| 11,070,511 | B2 | 7/2021 | O'Brien et al. |
| 11,144,198 | B2 | 10/2021 | Fredrich et al. |
| 11,144,980 | B2 | 10/2021 | Fredrich et al. |
| 11,176,533 | B2 | 11/2021 | Maxwell et al. |
| 11,250,055 | B2 | 2/2022 | Micucci et al. |
| 11,265,271 | B2 | 3/2022 | Tetrealt et al. |
| 11,315,132 | B2 | 4/2022 | Kiran et al. |
| 11,562,095 | B2 | 1/2023 | Diamant et al. |
| 2005/0209997 | A1 | 9/2005 | Haas et al. |
| 2007/0112717 | A1 | 5/2007 | Serrano-Morales et al. |
| 2007/0219943 | A1 | 9/2007 | Draughn |
| 2009/0089240 | A1 | 4/2009 | Winter et al. |
| 2009/0182718 | A1 | 7/2009 | Waclawik et al. |
| 2010/0088344 | A1 | 4/2010 | Treat et al. |
| 2013/0055118 | A1 | 2/2013 | Donovan et al. |
| 2016/0241502 | A1 | 8/2016 | Georgiou |
| 2019/0043106 | A1 | 2/2019 | Talmor et al. |
| 2020/0013092 | A1 | 1/2020 | Liu et al. |
| 2021/0019125 | A1 | 1/2021 | Shi et al. |
| 2022/0284013 | A1 | 9/2022 | Panuganty et al. |
| 2025/0181589 | A1 | 6/2025 | McGrath et al. |
| 2025/0181624 | A1 | 6/2025 | Bradt et al. |

OTHER PUBLICATIONS

Boufenneche, Web Analytics Tools for e-Commerce: An Overview and Comparative Analysis, pp. 51-72, (Year: 2022).*

Viana, 5 Ways AI can take your emails to the next level, pp. 1-15, Jun. 4, 2024.*

* cited by examiner

100

100

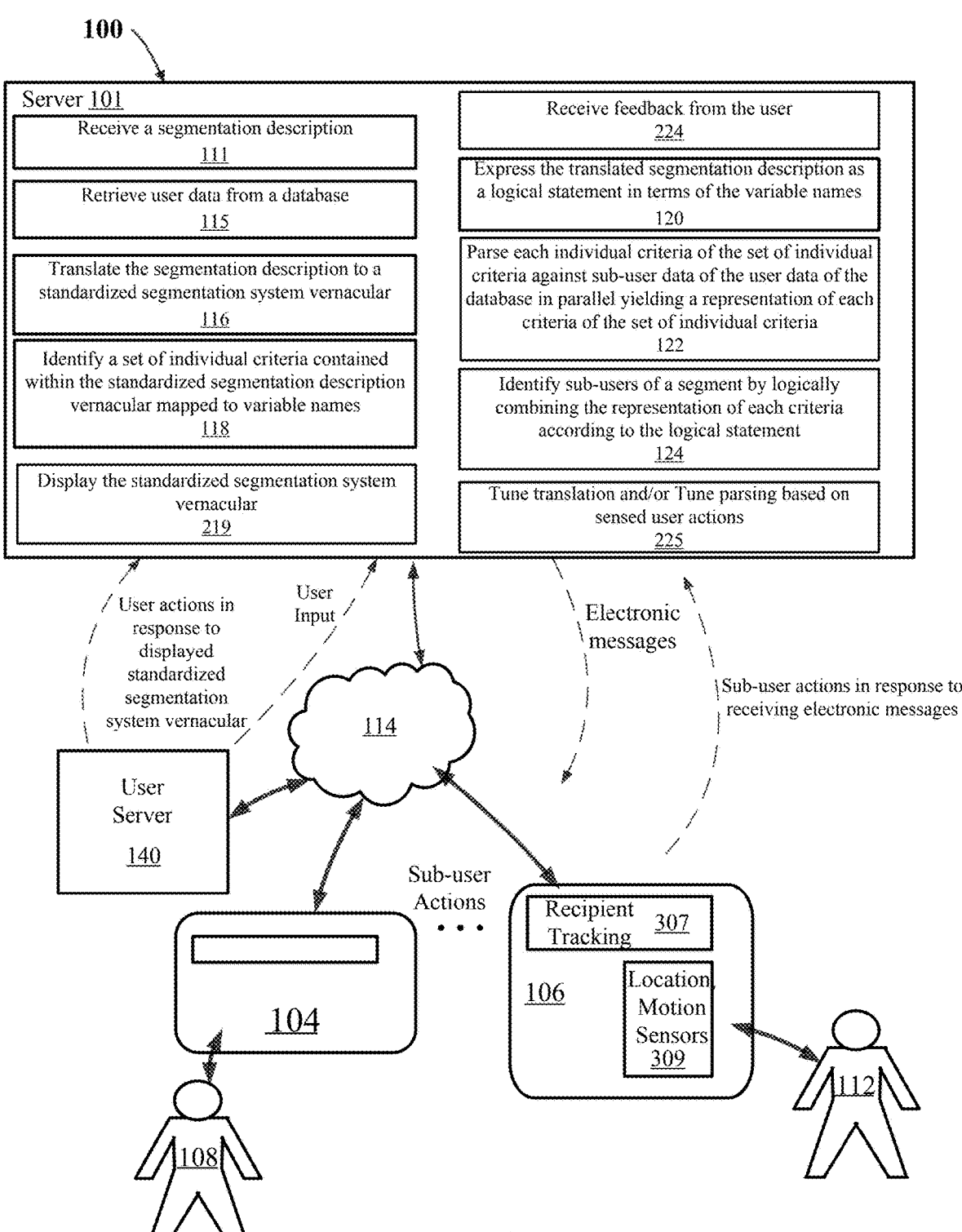

Server 101

Receive a segmentation description
111

Retrieve user data from a database
115

Translate the segmentation description to a standardized segmentation system vernacular
116

Identify a set of individual criteria contained within the standardized segmentation description vernacular mapped to variable names
118

Display the standardized segmentation system vernacular
219

Receive feedback from the user
224

Express the translated segmentation description as a logical statement in terms of the variable names
120

Parse each individual criteria of the set of individual criteria against sub-user data of the user data of the database in parallel yielding a representation of each criteria of the set of individual criteria
122

Identify sub-users of a segment by logically combining the representation of each criteria according to the logical statement
124

Tune translation and/or Tune parsing based on sensed user actions
225

User actions in response to displayed standardized segmentation system vernacular User Input Electronic messages Sub-user actions in response to receiving electronic messages

114

User Server
140

Sub-user Actions

104

Recipient Tracking  307

106

Location Motion Sensors
309

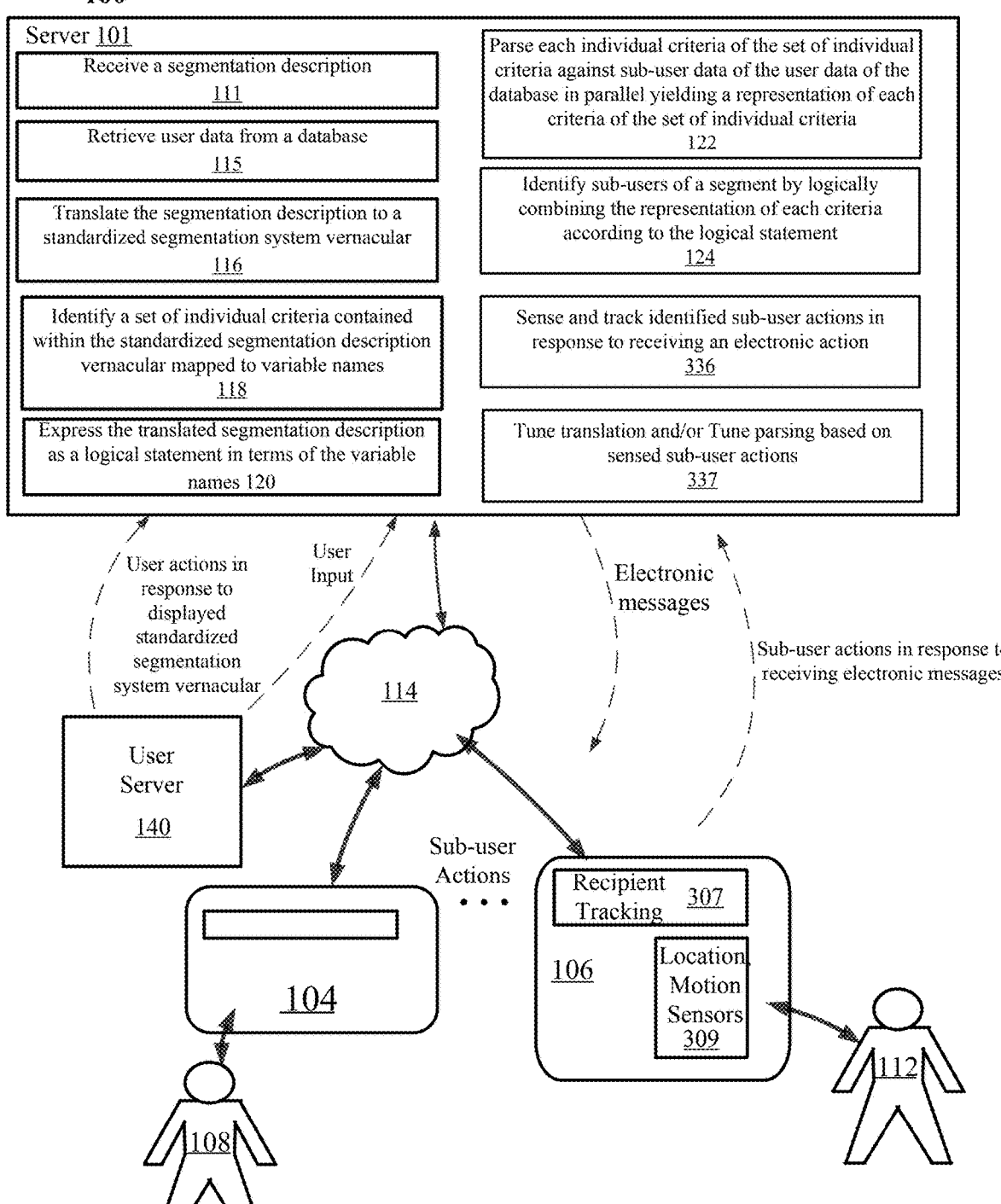

Server 101

Receive a segmentation description
111

Retrieve user data from a database
115

Translate the segmentation description to a
standardized segmentation system vernacular
116

Identify a set of individual criteria contained
within the standardized segmentation description
vernacular mapped to variable names
118

Express the translated segmentation description
as a logical statement in terms of the variable
names 120

Parse each individual criteria of the set of individual
criteria against sub-user data of the user data of the
database in parallel yielding a representation of each
criteria of the set of individual criteria
122

Identify sub-users of a segment by logically
combining the representation of each criteria
according to the logical statement
124

Sense and track identified sub-user actions in
response to receiving an electronic action
336

Tune translation and/or Tune parsing based on
sensed sub-user actions
337

User actions in
response to
displayed
standardized
segmentation
system vernacular User
Input Electronic
messages Sub-user actions in response to
receiving electronic messages

114

User
Server
140

Sub-user
Actions
• • •

104

Recipient
Tracking     307

106    Location
Motion
Sensors
309

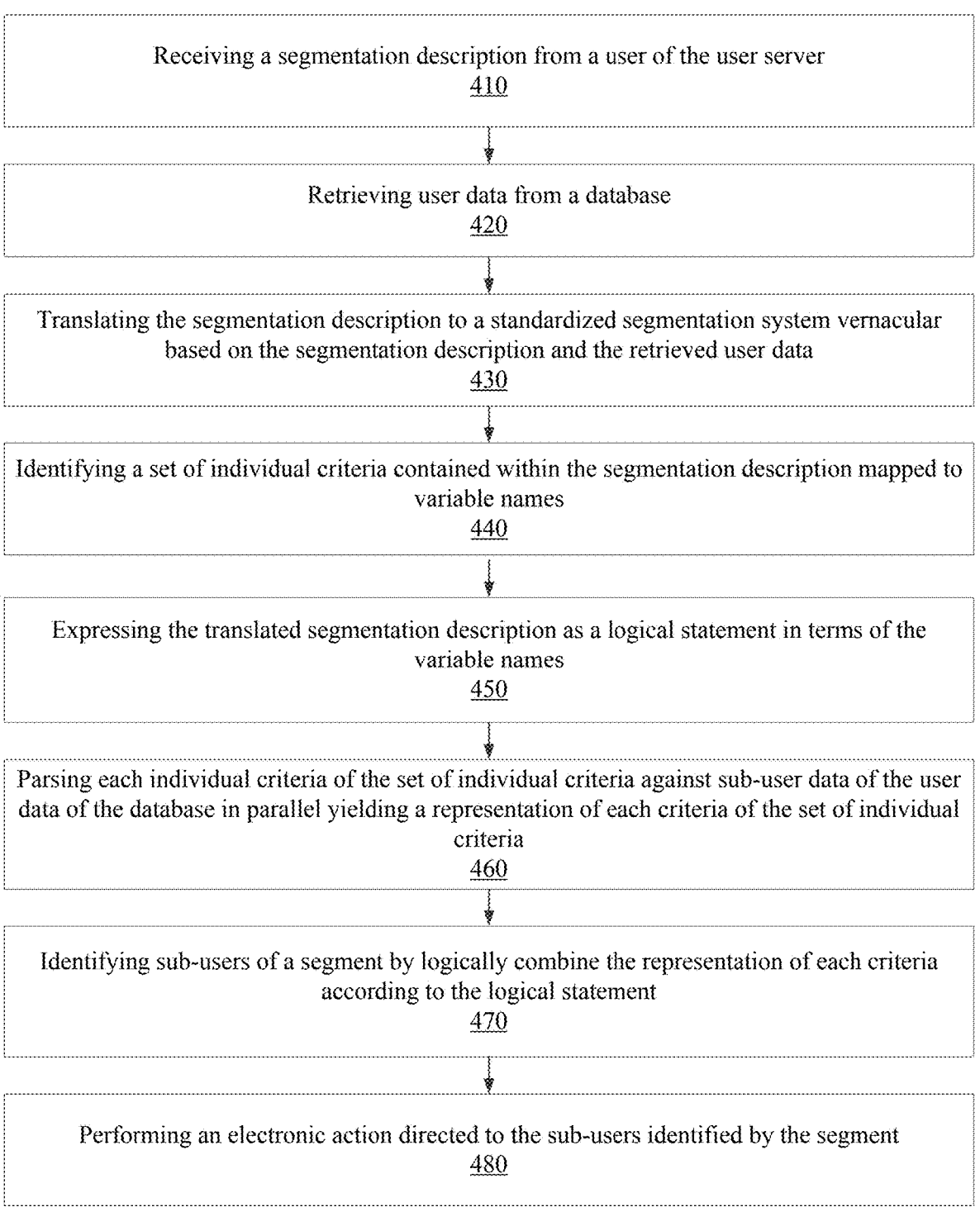

Receiving a segmentation description from a user of the user server
410

Retrieving user data from a database
420

Translating the segmentation description to a standardized segmentation system vernacular based on the segmentation description and the retrieved user data
430

Identifying a set of individual criteria contained within the segmentation description mapped to variable names
440

Expressing the translated segmentation description as a logical statement in terms of the variable names
450

Parsing each individual criteria of the set of individual criteria against sub-user data of the user data of the database in parallel yielding a representation of each criteria of the set of individual criteria
460

Identifying sub-users of a segment by logically combine the representation of each criteria according to the logical statement
470

Performing an electronic action directed to the sub-users identified by the segment
480

*FIG. 4*

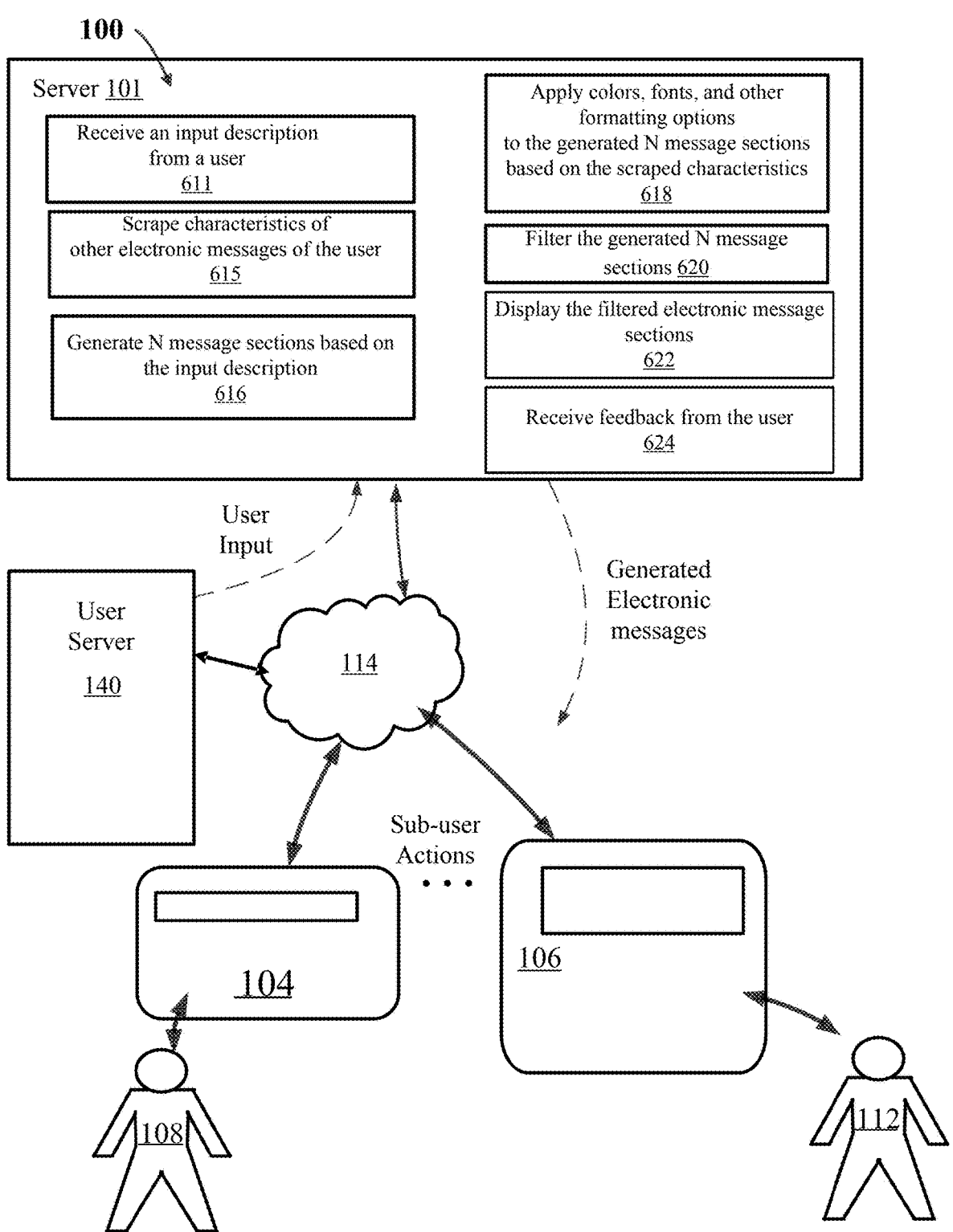

100

Server 101

Receive an input description
from a user
611

Scrape characteristics of
other electronic messages of the user
615

Generate N message sections based on
the input description
616

Apply colors, fonts, and other
formatting options
to the generated N message sections
based on the scraped characteristics
618

Filter the generated N message
sections 620

Display the filtered electronic message
sections
622

Receive feedback from the user
624

User
Input

User
Server
140

114

Generated
Electronic
messages

Sub-user
Actions
• • •

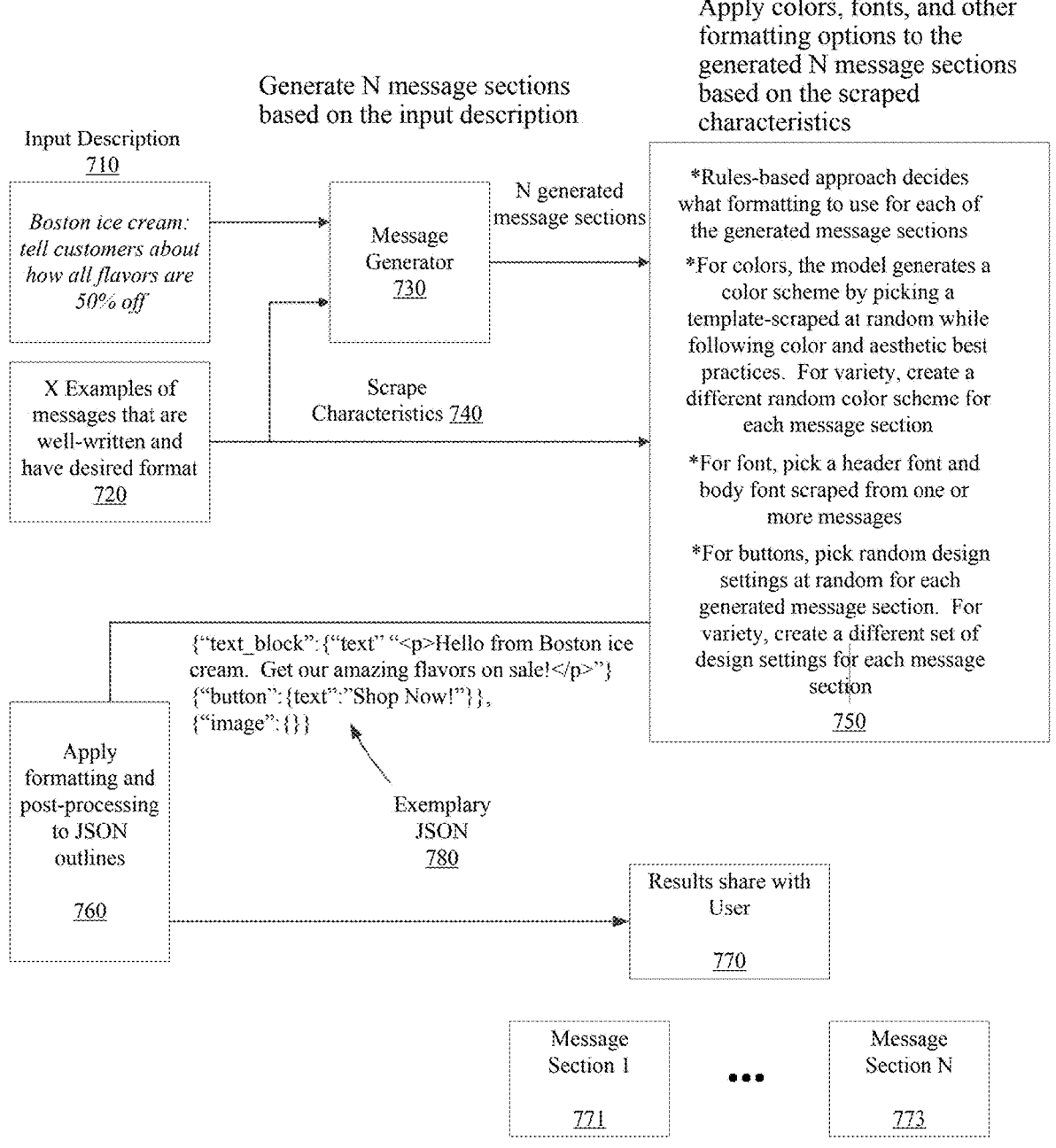

Generate N message sections
based on the input description

Apply colors, fonts, and other
formatting options to the
generated N message sections
based on the scraped
characteristics Input Description
710

*Boston ice cream:
tell customers about
how all flavors are
50% off*

Message
Generator
730

N generated
message sections

*Rules-based approach decides
what formatting to use for each of
the generated message sections

*For colors, the model generates a
color scheme by picking a
template-scraped at random while
following color and aesthetic best
practices. For variety, create a
different random color scheme for
each message section X Examples of
messages that are
well-written and
have desired format
720

Scrape
Characteristics 740

*For font, pick a header font and
body font scraped from one or
more messages

*For buttons, pick random design
settings at random for each
generated message section. For
variety, create a different set of
design settings for each message
section
750

{"text_block":{"text" "<p>Hello from Boston ice
cream. Get our amazing flavors on sale!</p>"}
{"button":{text":"Shop Now!"}},
{"image":{}}

Apply
formatting and
post-processing
to JSON
outlines

760

Exemplary
JSON
780

Results share with
User

770

Message
Section 1

771

...

Message
Section N

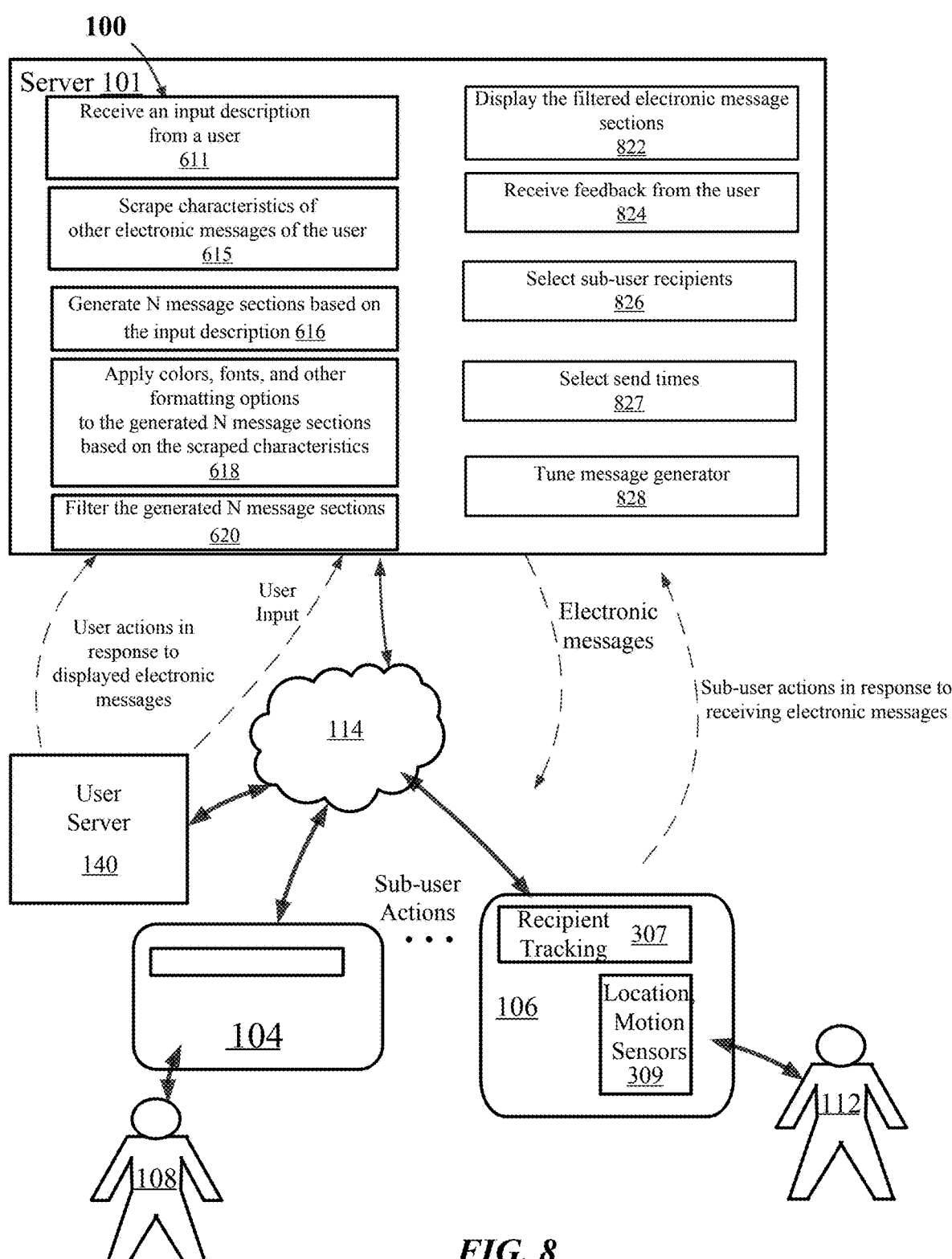

100

Server 101

Receive an input description from a user
611

Scrape characteristics of other electronic messages of the user
615

Generate N message sections based on the input description 616

Apply colors, fonts, and other formatting options to the generated N message sections based on the scraped characteristics
618

Filter the generated N message sections
620

Display the filtered electronic message sections
822

Receive feedback from the user
824

Select sub-user recipients
826

Select send times
827

Tune message generator
828

User actions in response to displayed electronic messages

User Input

Electronic messages

Sub-user actions in response to receiving electronic messages

114

User Server
140

Sub-user Actions

104

• • •

Recipient Tracking    307

106

Location Motion Sensors
309

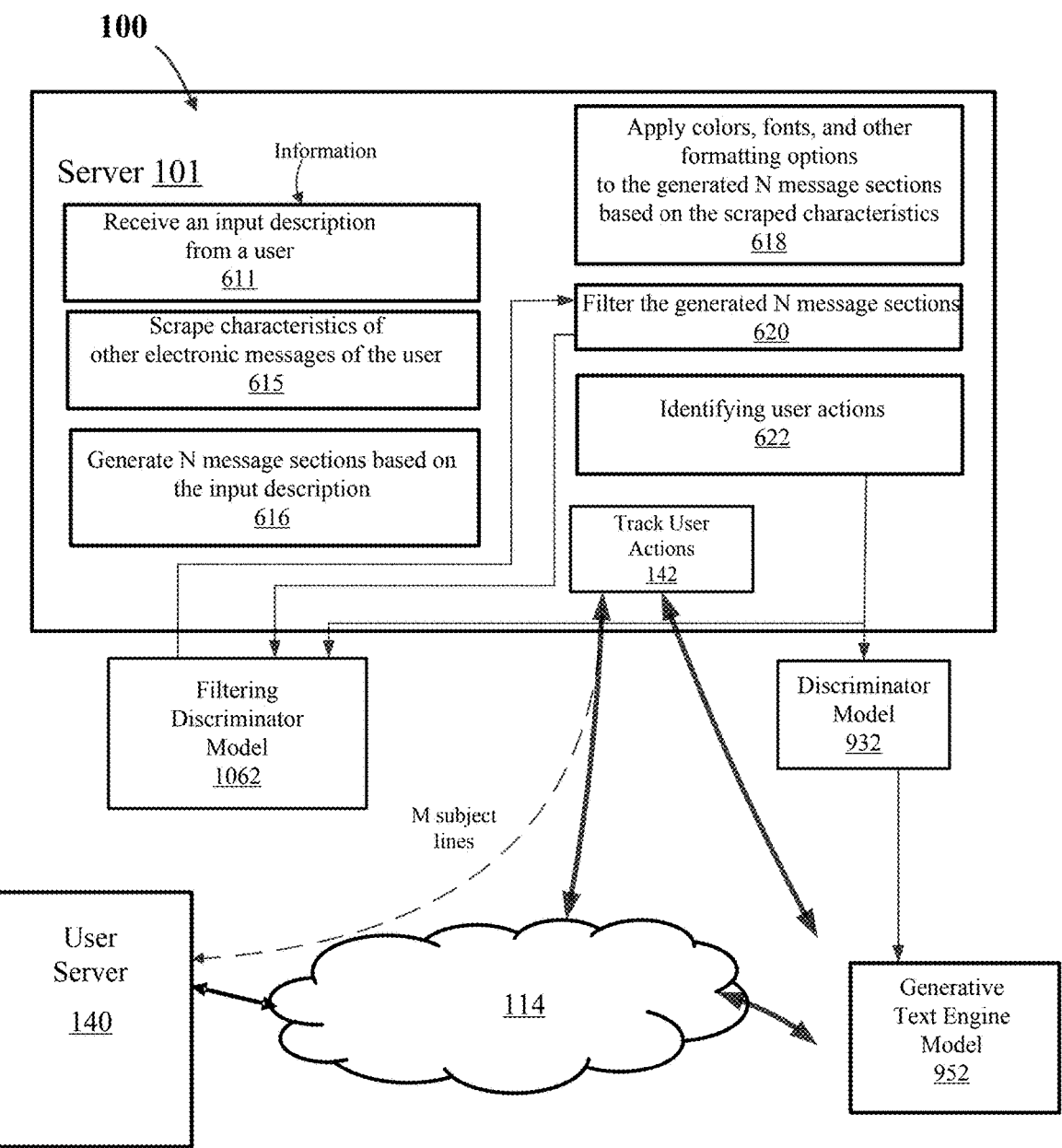

Server 101          Information

Receive an input description
from a user
611

Scrape characteristics of
other electronic messages of the user
615

Generate N message sections based on
the input description
616

Apply colors, fonts, and other
formatting options
to the generated N message sections
based on the scraped characteristics
618

Filter the generated N message sections
620

Identifying user actions
622

Track User
Actions
142

Filtering
Discriminator
Model
1062

Discriminator
Model
932

M subject
lines

User
Server
140

114

Generative
Text Engine
Model
952

*FIG. 10*

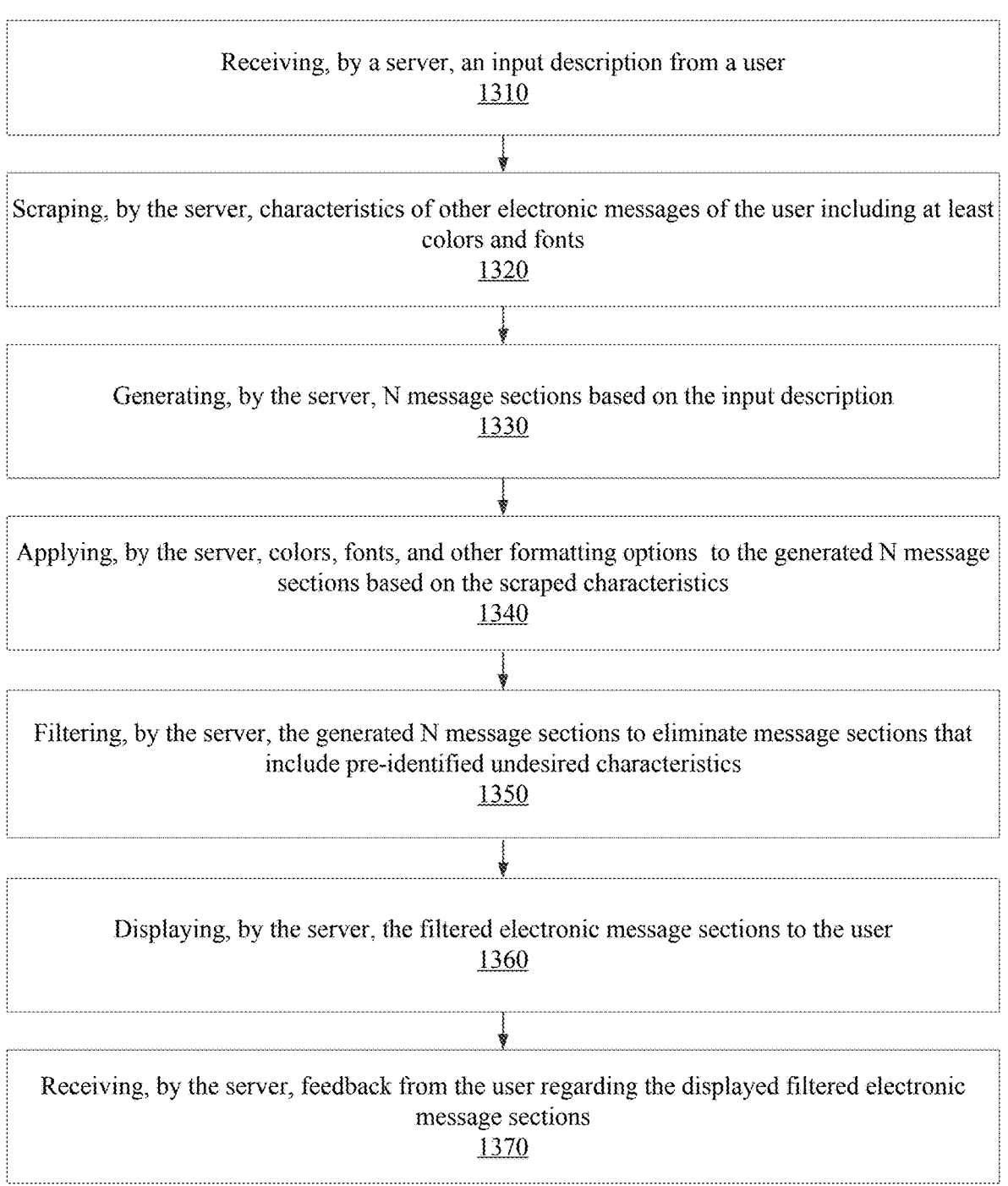

Receiving, by a server, an input description from a user
1310

Scraping, by the server, characteristics of other electronic messages of the user including at least colors and fonts
1320

Generating, by the server, N message sections based on the input description
1330

Applying, by the server, colors, fonts, and other formatting options to the generated N message sections based on the scraped characteristics
1340

Filtering, by the server, the generated N message sections to eliminate message sections that include pre-identified undesired characteristics
1350

Displaying, by the server, the filtered electronic message sections to the user
1360

Receiving, by the server, feedback from the user regarding the displayed filtered electronic message sections
1370

*FIG. 13*

1410
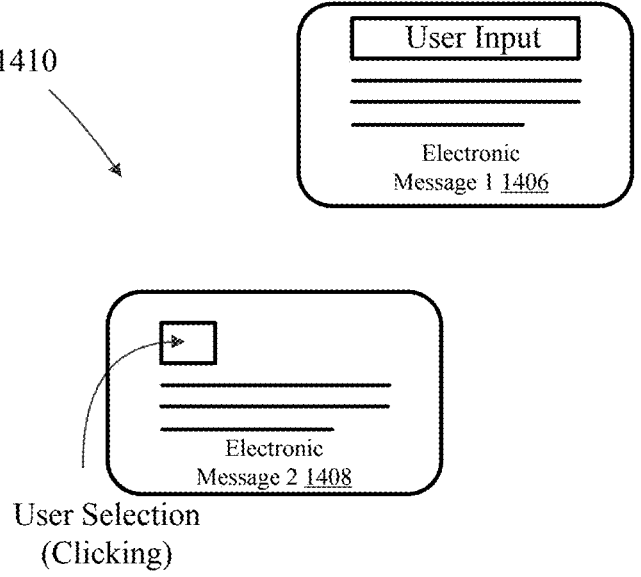
1420
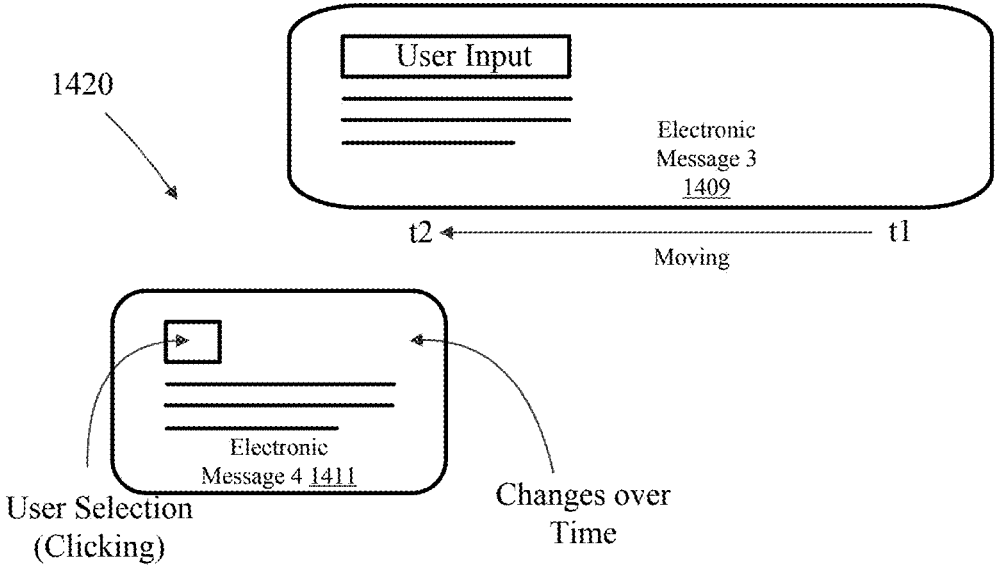
*FIG. 14*

ELECTRONIC CATEGORIZATION OF SUB-USERS OF A DATABASE FOR RECEIVING AN ELECTRONIC ACTION

FIELD OF THE DESCRIBED EMBODIMENTS

The described embodiments relate generally to intelligently accessing a database. More particularly, the described embodiments relate to systems, methods, and apparatuses for electronic categorization of sub-users of a database for receiving an electronic action.

BACKGROUND

Users frequently send electronic messages to current and prospective sub-users to solicit a response from sub-user recipients. The categorization of sub-users receiving the electronic messages can influence the success of the electronic messages.

It is desirable to have methods, apparatuses, and systems for electronic categorization of sub-users of a database for receiving an electronic action.

SUMMARY

An embodiment includes a computer-implemented method for electronic categorization of sub-users of a database for receiving an electronic action. The method includes receiving a segmentation description from a user of the user server, retrieving user data from the database, translating the segmentation description to a standardized segmentation system vernacular based on the segmentation description and the retrieved user data, identifying a set of individual criteria contained within the standardized segmentation description vernacular mapped to variable names, expressing the standardized segmentation system vernacular as a logical statement in terms of the variable names, parsing each individual criteria of the set of individual criteria against sub-user data of the user data of the database in parallel yielding a representation of each criteria of the set of individual criteria, identifying sub-users of a segment by logically combine the representation of each criteria according to the logical statement, and performing an electronic action directed to the sub-users identified by the segment.

Another embodiment includes an apparatus for electronic categorization of sub-users of a database for receiving an electronic action. The apparatus includes a segmentation server, a user server, and a plurality of sub-user computing devices connected through the network to the user server and the segmentation server. The segmentation server is configured to receive a segmentation description from a user of the user server, retrieve user data from a database, translate the segmentation description to a standardized segmentation system vernacular based on the segmentation description and the retrieved user data, identify a set of individual criteria contained within the standardized segmentation description vernacular mapped to variable names, express the standardized segmentation system vernacular as a logical statement in terms of the variable names, parse each individual criteria of the set of individual criteria against sub-user data of the user data of the database in parallel yielding a representation of each criteria of the set of individual criteria, identify sub-users of a segment by logically combine the representation of each criteria according to the logical statement, and perform an electronic action directed to the sub-users identified by the segment.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 2 shows a system for electronic categorization of sub-users of a database for receiving an electronic action, according to another embodiment.

FIG. 3 shows a system for electronic categorization of sub-users of a database for receiving an electronic action, according to another embodiment.

FIG. 4 is a flow chart that includes steps of a method for electronic categorization of sub-users of a database for receiving an electronic action, according to an embodiment.

FIG. 6 shows a system for electronic message generation, according to an embodiment.

FIG. 7 shows a process for generating an electronic message, according to another embodiment.

FIG. 8 shows a system for electronic message generation, according to another embodiment.

FIG. 10 shows a system for electronic message generation, according to another embodiment.

FIG. 13 is a flow chart that includes steps of a method for electronic message generation, according to an embodiment.

FIG. 14 shows electronic messages, wherein each electronic message includes different content or behavior, according to an embodiment.

DETAILED DESCRIPTION

The embodiments described include methods, apparatuses, and systems for electronic categorization of sub-users of a database for receiving an electronic action. Improvements in the categorization of sub-users saves a user time in creating distribution lists for electronic actions, such as, electronic messages. Additionally, improved distribution lists result in better performance (which can be measured by actions of a user and/or by sensed actions of recipients (sub-users) of the electronic messages) of the electronic messages.

The described embodiments solve practical problems associated with automatic electronic categorization of sub-users of a database for receiving electronic actions that are likely to solicit a response from recipients (sub-users) of the electronic actions. The electronic actions can include information to be conveyed to sub-users (recipients). The information can be related to anything, such as safety alerts (for example, a need for vaccinations, of natural disasters, or criminal activity), wildfires, political events, etc. Further, the described embodiments further solve practical problems associated with automatically categorization of sub-user recipients of messages that are more or less likely to solicit the response from the recipients (sub-users). Further, the described embodiments further solve practical problems associated with tuning the categorization of sub-user recipients based on preferences and actions of users who input a segmentation description and based on tracking and monitoring the actions of recipients (sub-users) of the electronic messages. Additionally, the different electronic messages may include different content and/or behavior. For an embodiment, the behavior can include the behavior of the display of the different electronic messages being different. For example, the display of different electronic messages may include motion of the display of the electronic messages. Accordingly, based on the sensed behavior of recipients of the electronic messages, the display may selectively vary to improve a user interface of the recipient sub-user.

Figure 1:
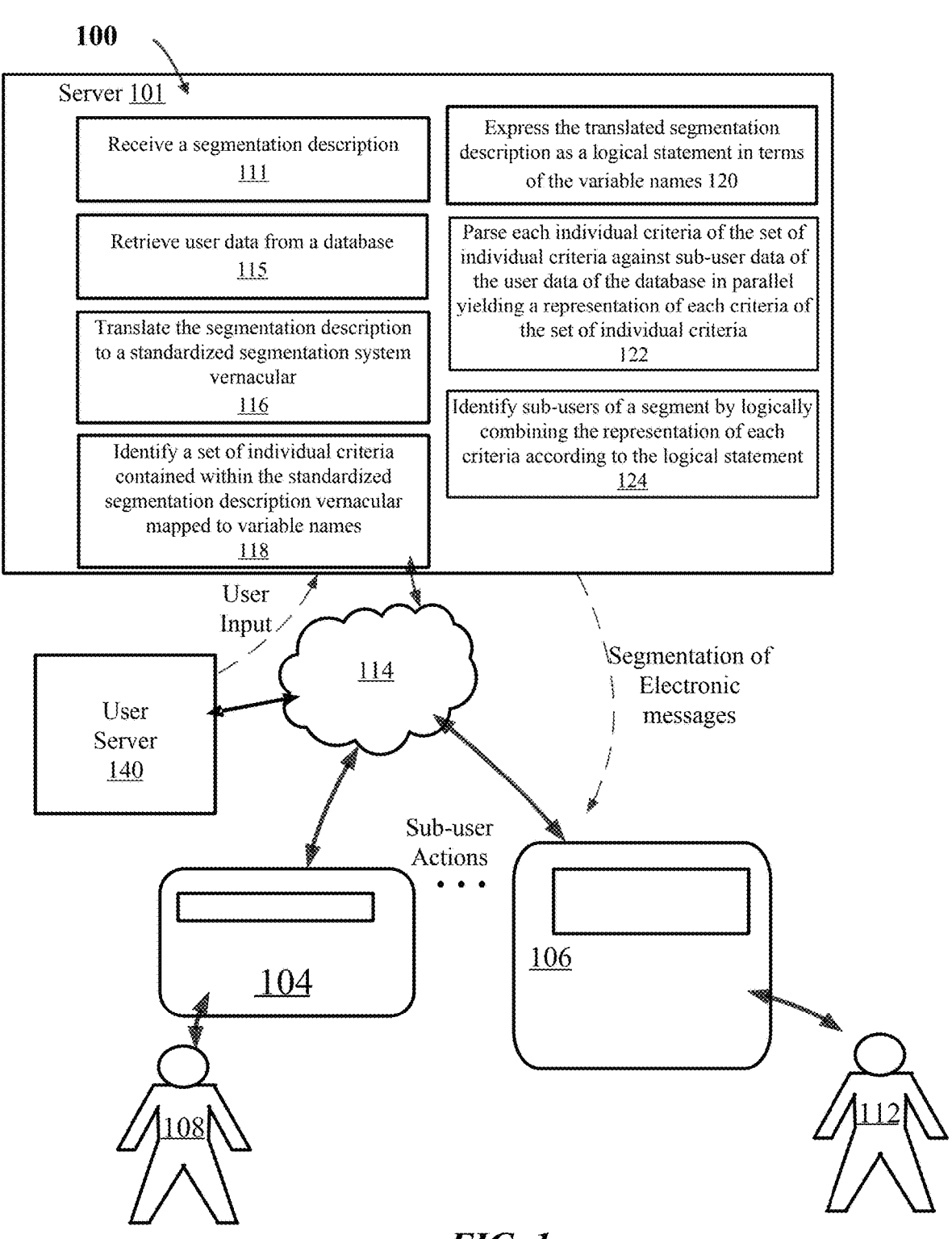
FIG. 1 shows a system for electronic categorization of sub-users of a database for receiving an electronic action, according to an embodiment.

FIG. 1 shows a system 100 for electronic categorization of sub-users of a database for receiving an electronic action, according to an embodiment. The system 100 includes a server 101 that is connected through an electronic network 114 to at least a user server 140 of a user. For an embodiment, the user server 140 manages a website of the user. It is to be understood that the term "user" is being used liberally. For example, a user can include, for example, a teacher, a doctor, a restaurant owner, etc. Further, it is to be understood that at least some embodiments for generating electronic messages are implemented at the server 101 which is accessed by the user on a client side of the server 101. Specifically, for an embodiment, generating electronic messages is performed by a UI (user interface) of the server 101. For an embodiment, the user provides control to the server 101 through the user server 140. For an embodiment, the sub-users have visited the website of the user.

For an embodiment, the server 101 receives 111 from the user server 140 a segmentation description from the user. For an embodiment, the segmentation description includes a text input, wherein the text input is the user's attempt to define a segment of sub-users of the user that are to be categorized for an electronic action. For an embodiment, the text input is limited to a set number of characters. However, for at least some other embodiments, the input description includes more than text. For embodiment, the input description includes an email. For example, for an embodiment, the input description includes images, such as, an image of a product. For an embodiment, input description includes an image of an email. For an embodiment, the input description further includes user preferences, such as, color schemes, brand voice, fonts, etc.

For an embodiment, the server 101 further operates to retrieve (115) user data from a database. For an embodiment, the retrieved user data includes raw sub-user event data including, for example, lists of sub-users and sub-user profile attributes.

For an embodiment, scraping of other sources of user data can provide or supplement the user data. For an embodiment, the scraping of other sources of user data can provide a determination of preferences of the user. At least some embodiments include scraping user data from previous electronic messages and/or segments of the user. It is to be understood that the user information can additionally include information of sub-users of the user, wherein the sub-users have had a prior electronic interaction or engagement with the user, such as, visiting a website of the user. At least some embodiments include the segmentation server creating and providing the user with suggested segment descriptions, wherein the created and suggested segment descriptions, wherein the segment description received from the user is based on the suggested segment descriptions. For an embodiment, the created and suggested segment descriptions are based on the user information including engagement information of sub-users of the user with regard to previous communications or website interactions of the sub-users with the user. Further, for at least some embodiments, additional information of sub-users of the user includes information previously captured through, for example, survey response, demographic information, or geographic information. Further, the scraping may be used to determine the color preferences of the user if generating electronic communication for the user. An embodiment includes determining the N (for example, 6) colors that are the most important to the user, and therefore, important to a brand of the user. For an embodiment, the determination is based on scraping code of a current message of the user. For an embodiment, the determination is based on scraping code of other messages of the users. For an embodiment, the determination is based on scraping code of one or more websites of the user. For an embodiment, the color determination is directed to text or wording of the user. An embodiment includes making the determination by counting letters of the messages or websites allocated to each color. An embodiment includes making the determination by counting words of the messages or websites allocated to each color. An embodiment includes determining the top X (such as, two) common background colors. For an embodiment, this includes scraping the code of the messages or websites of the user to determine the percentage of the background that is allocated to each color. An embodiment includes determining the top selectable button colors. For an embodiment, this includes scraping the code of the messages or websites of the user to determine the percentage of the selectable buttons that are allocated to each color.

For an embodiment, the server 101 further operates to translate (116) the segmentation description to a standardized segmentation system vernacular based on the segmentation description and the retrieved user data. For an embodiment, the translation of the server 101 takes the segmentation description and generates an output (the standardized segmentation system vernacular) that includes only criteria that are within the set of allowable criteria that are permitted by the system. For an embodiment, the allowable criteria is adapted to particular users based on the information or data collected by that user on its sub-users. But for another embodiment, the allowable criteria are fixed and set by the segmentation system. Note that for an embodiment, the set of allowable criteria are set or determined before the time of the translation. For an embodiment, the allowable set of criteria are selected by the user. For other embodiments, the allowable set of criteria are selected as listed above.

For an embodiment, a text generation model generates standardized segmentation system vernacular by translating the segmentation description and the user information. The text generation model may include an LLM (large language model) that receives the segmentation description and the user data. For an embodiment, multiple versions of the standardized segmentation system vernacular can be provided to the user which the user can then select one or more of the standardized segmentation system vernaculars for generation of the segmentation. As described, for an embodiment the translator includes an LLM (large language model) that receives a textual input of the segmentation description. However, as described, the input description received from the user is not limited to text. The input description may include images as well. For an embodiment, the segmentation description includes one or more images, and the translator includes a MMLLM (multi-modal large language model). For an embodiment, the user feedback and sensed sub-user actions are used for training the MMLLM.

For an embodiment, the server 101 further operates to identify 118 a set of individual criteria contained within the segmentation description mapped to variable names. For an embodiment, the set of individual criteria are parsed from the translated segmentation description. For an embodiment, the variable names are placeholders that represent each of the individual criteria parsed from the translated input description. For an embodiment, the individual criteria A. B. C may include, for example:

"A": "I want sub-users who have clicked an email in the last 60 days"

"B": "I want sub-users who have clicked an SMS in the last 60 days"

"C": "I want sub-users who are not suppressed", wherein a suppressed sub-user is, for example, a sub-users who has opted out of promotional marketing.

For an embodiment, the server 101 operates to express 120 the translated segmentation description as a logical statement using the variable names as placeholders connected with AND/OR statements. For example, the logical statement may include "A or B and C" wherein A, B, and C are the individual criteria. For an embodiment, expressing the translated segmentation description as a logical statement is performed by an LLM.

For an embodiment, the server 101 further operates to parse 122 each individual criteria of the set of individual criteria against the user data in parallel yielding a representation of each criteria of the set of individual criteria. For an embodiment, the user data includes data about sub-users of the user. For an embodiment, the parsing includes filtering of the sub-user data of the user to identify which sub-users satisfy each of the individual criteria. For an embodiment, the parsing of the individual criteria may be performed by LLM agents. For an embodiment, the LLM agents that parse (filter) the user data are trained based at least in part on the sensed feedback of the sub-users upon receiving electronic actions based on the segmentation. For an embodiment, the LLM agents are provided with examples of input and output pairs and try to cover a variety of interesting cases that may arise. That is, examples of individual criteria are provided to the LLM agents along with examples of corresponding representations of each criteria of the set of individual criteria.

For an embodiment, the server 101 further operates to identify 124 sub-users of a segment by logically combining the representation of each criteria according to the logical statement.

For an embodiment, the server 101 further operates to perform an electronic action directed to the sub-users identified by the segment. For an embodiment, the server 101 further operates to send electronic messages to computing devices 104, 106 of sub-users 108, 112 identified by the segment. For an embodiment, the sub-users 108, 112 are identified as having visited a website of the user. For an embodiment, the electronic action includes reporting various metrics for the segment of sub-users to the user (e.g. various conversion rates, revenue, demographic data, etc.). For an embodiment, the electronic action includes suggesting a variety of custom-tailored messages and content for the segment of sub-users to the user. For an embodiment, the server 101 monitors sub-user actions in response to the electronic action. The monitored sub-user actions can be used to learn preferences and model engagement patterns for the sub-user recipients of the generated segment (for example, preferred send time for various types of electronic messages).

For an embodiment, the segmentation server 101 is further configured to create suggested segment descriptions and display the suggested segment descriptions to the user. That is, instead of merely receiving the segment description from the user, the segmentation server proactively provides the suggested segment descriptions to the user which the user may select without changes or may elect to edit the suggested segment descriptions. For this embodiment, the segment description received from the user is based on the suggested segment descriptions. For an embodiment, the created suggested segment descriptions can be based on one or more of previous user inputs, existing segments in a user account, comparisons against user peer groups, recipient engagement with previous segments, previous electronic messaging and engagement per recipient. For an embodiment, the suggested segment descriptions are based on user and/or sub-user actions in response to receiving past electronic messages.

For an embodiment, the segmentation server 101 is further configured to compare named entities called out in the segmentation description against the metrics and information retrieved from the user data to find a best match for each, wherein the best matches for each of the list name and metrics are translated to the standardized segmentation system vernacular based on the segmentation description and the retrieved user data. This embodiment is useful and helpful when, for example, the received segmentation description includes a list names and metrics that may have been misspelled or mis-entered or just described differently "ex. Live in USA vs United States". For an embodiment, the comparison is performed during the parsing 122, and for an embodiment, includes entities such as list names, metrics, and more. For an embodiment, a relevant set of user data is retrieved depending on the criteria identified. For an embodiment, the relevant set of user data includes metrics that track sub-user actions (for example, placed an order, opened email, clicked email, etc.), attributes of these metrics (for example, set of all item names that a sub-user can place an order for), sub-user profile properties and values of those properties (e.g. City, Country, Created, Email, First Active, First Name, Last Active, Last Name, Organization, Phone Number, State/Region, Title, Zip Code), list names of all lists created by the user (e.g. 'VIPs', 'Early Access Signups', 'All email subscribers'), and the names of predictive analytics about sub-users (such as, total customer lifetime value, predicted number of orders, predicted gender, etc.). An embodiment includes using a combination of standard approximate string matching algorithms and LLMs to try to intelligently match each named entity the user includes in the segment description with the closest option contained in the user data.

For an embodiment, the yielded representation of each criteria of the set of individual criteria includes a JSON (JavaScript object syntax) object. JSON is an open standard file format and data interchange format that uses human-readable text to store and transmit data objects consisting of attribute-value pairs and arrays. It is a commonly used data format with diverse uses in electronic data interchange, including that of web applications with servers. JavaScript Object Notation (JSON) is a standard text-based format for representing structured data based on JavaScript object syntax. It is commonly used for transmitting data in web applications (e.g., sending some data from the server to the client, so it can be displayed on a web page, or vice versa).

A JSON object is useful here because it's an industry standard notation for representing data objects.

For an embodiment, the segmentation server 101 is further configured to sense sub-user actions in response to receiving an electronic communication based on the sub-users being included within the segment. At least some embodiments further include adjusting future translations based on the sensed sub-user actions. That is, the sensed sub-user actions can be used to train the translation in order to improve the quality of future translations. That is, segmentation or categorizations of sub-users that result in sub-user actions as a result of receiving an electronic action or communication as a result of being included in the segmentation or categorizations are favored and influence future translations.

At least some embodiments further include adjusting parsing of future individual criteria based on the sensed sub-user actions. That is, the sensed sub-user actions can be used to train the parsing 122 in order to improve the quality of parsing of future individual criteria. As an embodiment, one can imagine parsing a user's vague input in multiple ways (for example, sub-users who did X recently—how is "recently" parsed). One way is to try different time windows and then pick the one that seems to resonate the best by identifying which parsed version of "recently" yielded the highest level of engagement or result the greatest amount of recipient actions.

For an embodiment, identifying sub-users of a segment by logically combining the representation of each criteria according to the logical statement includes logically the different criteria with "AND" and "OR" logic.

For at least some embodiments the segmentation server 101 is further configured to generate two or more versions of identified sub-users of two or more segmentation versions based on two or more versions of the standardized segmentation system vernacular, electronically sending the electronic messages to the two or more versions of identified sub-users, monitor actions of the two or more versions of identified sub-users based on responses to receiving the electronic messages, and rank the two or more versions of the standardized segmentation system vernacular based on the monitored actions. That is, for example, the two or more versions of generated lists of sub-users are tested against each other to determine which of the generated lists performs the best. The results of the testing can be used to rank the lists in order of performance to determine which provided the best performance. As described, for an embodiment, the ranking is based on the level of engagement of the sub-users due to receiving an electronic action (such as, an electronic message). The level of engagement can be based on sensing the actions of the recipient sub-users in response to receiving the electronic action.

For an embodiment, the segmentation server 101 is further configured to train future translations of segmentation descriptions to the standardized segmentation system vernacular based on the rankings of the two or more versions of the standardized segmentation system vernacular. That is, the translations can be adjusted to prefer successful translations that resulted in successful (higher ranked) segmentations and adjusted to avoid less successful translations.

FIG. 2 shows a system for electronic categorization of sub-users of a database for receiving an electronic action, according to another embodiment. For an embodiment, the translated segmentation description is displayed 219 to the user. The user can then select, reject, or edit the translated segmentation description. The actions and additional or alternate actions of the user can be tracked and monitored. The tracked and monitored actions can be used to train future translations.

As shown, the server 101 receives 224 feedback user actions in response to the translated segmentation description being displayed to the user. As shown, for an embodiment, the server 101 further operates 225 to tune the translation and/or tune the parsing based on the sensed user actions. Sensing the user action is response to the translated segmentation description being displayed to the user can include, for example, sensing the user editing the translated segmentation description, the user rejecting the translated segmentation description and indicating to discard the translated segmentation description, the user altering their input segmentation description and the server generating another translated segmentation description based on the altered input segmentation description, the server generating another (additional) translated segmentation description based on the originally input segmentation description (there is some level of randomness in the system so rerunning with the same input segmentation description may provide a different result), or the user may accept the segment as is and continue to the identification of sub-users of the segment.

For an embodiment, the standardized segmentation system vernacular is presented to the user. Here, the user feedback can be utilized to essentially train future translations. This could include sensing of user actions—including the previously described editing of the displayed translated segmentation description.

FIG. 3 shows a system for electronic categorization of sub-users of a database for receiving an electronic action, according to another embodiment. As previously described, an electronic action, such as, an electronic message is directed to identified sub-users of a segment by logically combining the representation of each criteria according to the logical statement. Further, for an embodiment, the server 101 further operates 336 to sense and track identified sub-user actions in response to receiving the electronic action. As shown, for an embodiment, the server 101 further operates 337 to tune the translation and/or tune the parsing based on the sensed and tracked identified sub-user actions in response to receiving the electronic action.

Tracking Sub-User (Electronic Message Recipient) Actions

As previously described, for an embodiment, the server 101 further operates to electronically send the set of generated electronic messages to computing devices 104, 106 of sub-users 108, 112. For an embodiment, the computing devices 104, 106 of the sub-users 108, 112 are electronically connected to the server 101 and the user server 140 through, for example, the network 114. For an embodiment, the server 101 tracks sub-user actions based on the electronic messages displayed to one or more sub-users 108, 112 of the user of the user server 140.

For an embodiment, when the sub-user loads a webpage of the user, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored.

For an embodiment, the user-tracking code can utilize sensors on the computing device of the sub-user to track actions of the computing device. For example, the computing device may be a mobile device that includes motion and location sensors that can identify actions of the sub-user that can be correlated with the sub-user having received a displayed form. Further, actions of multiple sub-users can be sensed to determine correlations between different sub-users.

For an embodiment, the tracking of the sub-users includes tracking online activity and action by the sub-users. For an embodiment, a sub-user device (such as, devices 104, 106) alone or in conjunction with the server 101, or the user server 140 operates to sense the sub-user action data. For an embodiment, the sensed and tracked sub-user action data includes the sub-user computing device electronically sensing a sub-user performing an action or activity in response to the displaying of the electronic messages to the sub-user. For an embodiment, sensing the sub-user performing an action includes sensing that the sub-user is selecting or "clicking" a link included within the generated electronic message(s).

While the described embodiments are directed towards sensing sub-user action data, it is to be understood that at least some other embodiments can additionally or alternatively include the sensing of other types of data as well. For an embodiment, the sensed data can include user server data, such as, web traffic and purchases among message recipients. That is, the sensed sub-user action data could be replaced with, for example, data of daily total or new visitors on the user website.

The sub-user action data may be tracked (counted) over various possible time periods (such as, by the second, minute, hour, day, week, or month) and may include one or more of sub-users (108, 112) being active on the website of the user server 140, a sent email bouncing, a sub-user canceled order, a sub-user starting a checkout, a sub-user clicking (selecting) an email, a sub-user opening email, a sub-user placing order, a sub-user receiving email, a sub-user refunding an order, a sub-user unsubscribing, a sub-user viewing a product, a sub-user adding to a list (a list in the marketing automation platform of the server 101 account), and/or a sub-user adding an item to their cart.

It is to be understood, however, that there are very few limitations on what event types (sub-user actions) can be published (provided) to an automation platform of the server 101. Website managers (such as website manager of the user server 140) can implement their own events (sensed sub-user actions) that make sense for their business and simply send those events over to the automation platform of the server 101.

Further, as will be described, implementations of computing devices 104, 106 that include mobile devices that include recipient tracking sensors 307 and location/motion sensors 309 and can additionally or alternatively include additional types of sensed sub-user actions. Such sensed sub-user action can include sensing a physical sub-user visit and/or purchase. Further, such sensed sub-user action can include sensing a virtual sub-user visit and/or purchase online. That is, the sensing of the sub-user action can include sensing the sub-user visiting a physical location of the user, and/or the sub-user purchasing a product or service of the user at a physical store location of the user. Further, the sensed sub-user actions can include combinations or sequences of sub-user actions. For an embodiment, sensed sub-user actions are weighted based on the sensed sub-user actions. For an embodiment, only sensed sub-user actions having a weight, or a combination of weights that exceed a sub-user action threshold are considered a sub-user action for the purposes of detecting sub-user actions.

For an embodiment, the location monitoring of the mobile device of the sub-user is used to identify business locations visited by the recipient after receiving the electronic message(s) of the marketing message. Different businesses can be rated, wherein particular businesses yield a higher sub-user action score, and other particular businesses yield a lower engagement score. The sub-user action score of each business can be adaptively adjusted based on the electronic marketing message of the user and can be adjusted based on other businesses visited by the recipient. For an embodiment, patterns of location visits by the recipient can be used to influence the level of sub-user action.

For an embodiment, motion of the recipient is tracked by location and motion sensors 309 and can be used to influence the level of sub-user action. Certain actions (motions) of the recipient may indicate different levels of sub-user action. For an embodiment, the computing devices 104, 106 may include a mobile phone, a smart watch, or a headset. Motion of the recipient can include tracking hand motions, direction of eyesight, and/or orientations of the recipient. Accordingly, whether the recipient is in a physical location of a product of the user can be determined. Further, how long the recipient holds or looks at a specific product of the user can be determined. Further, whether the recipient interacts with another recipient can be determined. All the sensed/tracked locations and motions of the sub-user can be included within a score of the sub-user action. For example, visiting a restaurant after receiving a message is a very possible use case since this is an in-person sub-user action. Again, a score that exceeds a score threshold can be deemed a sub-user action. The actions and locations of the sub-user can be tracked 307 allowing patterns in the sub-user behavior to be determined. As described, sequences of behaviors by the sub-user can be ranked for determining a score which is used for determining whether a sub-user action has occurred.

Further, for an embodiment, different businesses physically visited can be rated, wherein particular businesses yield a higher success score and other particular businesses yield a lower success score. The success score of each business can be adaptively adjusted based on marketing messages and can be adjusted based on other businesses visited by the sub-user. For an embodiment, patterns of location visits by the sub-user can be used to influence the level of success. That is, for example, visiting a location of a business can be rated higher or lower based on a previous business visited by the sub-user.

As previously described, the sub-user tracking can include monitoring of web browsing of the sub-user. Online action and activity of the sub-user can influence the success score. Links accessed by the sub-user can be tracked. Websites visited by the sub-user can be tracked. Online purchases of the sub-user can be tracked. Each of the online web browsing of the sub-user can influence the success score of the sub-user actions.

For an embodiment, eye tracking of a sub-user can be sensed and used to see how long a sub-user observes an electronic message (how engaging the message is), or, how long the sub-user has the electronic message open on their screen. These observed actions can further be used to rank the success of generated electronic messages sent to sub-user(s).

For an embodiment, relationships between different sub-users are determined. For example, web tracking can determine online relationships between sub-users. Further, for an embodiment, a real physical relationship between sub-users can be established by tracking the locations of the different sub-users. Two sub-users may be identified as friends or associates or living together based on location tracking. Further, commonalities of recipients can be determined by identifying common locations, or common types of locations between the different sub-users. The influence one sub-user has on another sub-user can be measured and the influence can add or subtract from the success score.

For an embodiment, a level of sub-user action can be adaptively adjusted for each sub-user based on actions of an associated sub-user. An action by a related or common type of sub-user can influence how much an action by a sub-user influences the engagement determination or influences a success determination.

As previously described, the success determination of the described sub-user actions can be scored, and a score exceeding a score threshold can qualify as a sub-user action which is tracked.

The sub-user may then act upon the receiving and displaying of the electronic message(s). For an embodiment, the sub-user actions based on the displayed electronic message are monitored. For an embodiment, the sub-user actions are stored in the action database. For an embodiment, a second discriminator model of the server 101 generates a quality rating for each of the displayed electronic messages based on the previously described different sub-user actions. For an embodiment, the quality rating of each of the electronic messages is feedback to the server 101 to additionally influence the generation of electronic messages.

Tracking User Actions

For an embodiment, the server 101 is further configured to display the standardized segmentation system vernacular to the user. This allows the user to review and provide feedback if the user chooses to approve, update, or modify the standardized segmentation system vernacular before identifying the set of individual criteria contained within the standardized segmentation description vernacular mapped to variable names, and expressing the standardized segmentation system vernacular as a logical statement in terms of the variable names.

For an embodiment, the server 101 is configured to sense actions by the user including, for example, sensing the user selecting, rejecting, or editing the translated segmentation description. The actions and additional or alternate actions of the user can be tracked and monitored. The tracked and monitored actions can be used to train future translations. For an embodiment, the server 101 is further configured to feed the sensed actions back to the translator that performs the translation. For an embodiment, the feedback sensed actions are used to train the translator with the sensed action for future translations.

For an embodiment, the user can review the electronic messages before the electronic messages are electronically sent to the sub-users. However, this should be updated to reflect the user's review of the displayed standardized segmentation system vernacular. During this review, the user can edit or modify the electronic messages before being sent to the sub-users. These actions during the review of the electronic messages can be used to adaptively adjust future electronic messages based on monitoring the actions of the user. For an embodiment, the server 101 additionally tracks user actions based on the electronic messages displayed to the user of the user server 140. For at least some embodiments, the tracking of the user actions includes tracking the user selecting a displayed electronic message of a plurality of displayed electronic messages. Clicking the displayed electronic message indicates an interest by the user in the selected electronic message and indicates a level of value of the selected electronic message. For an embodiment, tracking of the user includes tracking the user modifying the electronic message, and submitting a final revised electronic message. For an embodiment, tracking of the user includes identifying differences between the electronic messages displayed to the user and the electronic message(s) sent by the user to sub-users of the user. Modifying a selected electronic message provides a level of value of the modified and submitted electronic message. For an embodiment, tracking of the user includes tracking future user copy (user copy is content written to promote or sell a product or service or to persuade readers to take a certain action. Marketing (user) copy is a useful tool that educates sub-users, provides resources and details contact information to help businesses increase awareness of their products and services) to identify if any of the electronic messages were used as tonal or stylistic inspiration in future communications. For an embodiment, tracking of the user actions includes tracking the user interacting with the electronic message generation system to allow more creative copy from users regardless of whether specific verbatim phrases are used in future communications. For an embodiment, tracking the actions of the user includes tracking messages sent by the user in any channel supported by the system including, for example, email, SMS, send push notifications, and others.

FIG. 4 is a flow chart that includes steps of a method for electronic categorization of sub-users of a database for receiving an electronic action, according to an embodiment. A first step 410 includes receiving a segmentation description from a user of the user server. A second step 420 includes retrieving user data from a database. A third step 430 includes translating the segmentation description to a standardized segmentation system vernacular based on the segmentation description and the retrieved user data. A fourth step 440 includes identifying a set of individual criteria contained within the standardized segmentation description vernacular mapped to variable names. A fifth step 450 includes expressing the standardized segmentation system vernacular as a logical statement in terms of the variable names. A sixth step 460 includes parsing each individual criteria of the set of individual criteria against sub-user data of the user data of the database in parallel yielding a representation of each criteria of the set of individual criteria. A seventh step 470 includes identifying sub-users of a segment by logically combining the representation of each criteria according to the logical statement. An eight step 480 includes performing an electronic action directed to the sub-users identified by the segment.

At least some embodiments further include creating suggested segment descriptions, and displaying the suggested segment descriptions, wherein the segment description received from the user is based on the suggested segment descriptions. The created suggested segment descriptions can be based on previous user inputs, existing segments in a user account, comparisons against user peer groups, recipient engagement with previous segments, and/or previous electronic messaging and engagement per recipient.

At least some embodiments further include comparing list names and metrics called out in the segmentation description against the metrics and information retrieved from the user data to find a best match for each, wherein the best matches for each of the list name and metrics are translated to the standardized segmentation system vernacular based on the segmentation description and the retrieved user data. This is especially helpful for list names and metrics that may have been misspelled or mis-entered or just described differently "ex. Live in USA vs United States".

At least some embodiments further include displaying the standardized segmentation system vernacular to the user, sensing actions by the user, feeding the sensed actions back to a translator that performs the translation, and trains the translator with the sensed action for future translations. For an embodiment, the standardized segmentation system vernacular is presented to the user. For an embodiment, the user feedback is utilized to train future translations. This could include sensing of user actions—including editing of the presentation.

For an embodiment, the yielded representation of each criteria of the set of individual criteria is a JSON (JavaScript object syntax) object. JSON is an open standard file format and data interchange format that uses human-readable text to store and transmit data objects consisting of attribute-value pairs and arrays. It is a commonly used data format with diverse uses in electronic data interchange, including that of web applications with servers.

At least some embodiments further include sensing sub-user actions in response to receiving an electronic communication based on the sub-users being included within the segment. At least some embodiments further include adjusting future translations based on the sensed sub-user actions. That is, translation adjustments are favored that increase engagement by the sub-users. At least some embodiments further include adjusting parsing of future individual criteria based on the sensed sub-user actions.

At least some embodiments further include generating two or more versions of identified sub-users of two or more segmentation versions based on two or more versions of the standardized segmentation system vernacular, electronically sending electronic messages to the two or more versions of identified sub-users, monitoring actions of the two or more versions of identified sub-users based on responses to receiving the electronic messages, and ranking the two or more versions of the standardized segmentation system vernacular based on the monitored actions. At least some embodiments further include training future translations of segmentation descriptions to the standardized segmentation system vernacular based on the rankings of the two or more versions of the standardized segmentation system vernacular. At least some embodiments further include training future parsing based on the rankings of the two or more versions of the standardized segmentation system vernacular.

For an embodiment, performing the electronic action directed to the sub-users identified by the segment includes sending an electronic message to the sub-users identified by the segment. For an embodiment, the electronic message is electronically generated based on message inputs of the user, and further including tuning the generation of the electronic message based on sensing actions of the user and based on sensing actions of the sub-user in response to electronically receiving the electronic message. At least some embodiments further include selecting one or more send times for the electronic message and adjusting send times for future generated electronic messages based on sensed actions of the sub-users in response to receiving the electronic message. For an embodiment, the electronic message at least partially controls a display of a user interface of each of the sub-users, and further comprises adjusting the user interface based at least in part on sensed actions of the sub-users in response to receiving the electronic message.

Figure 5:
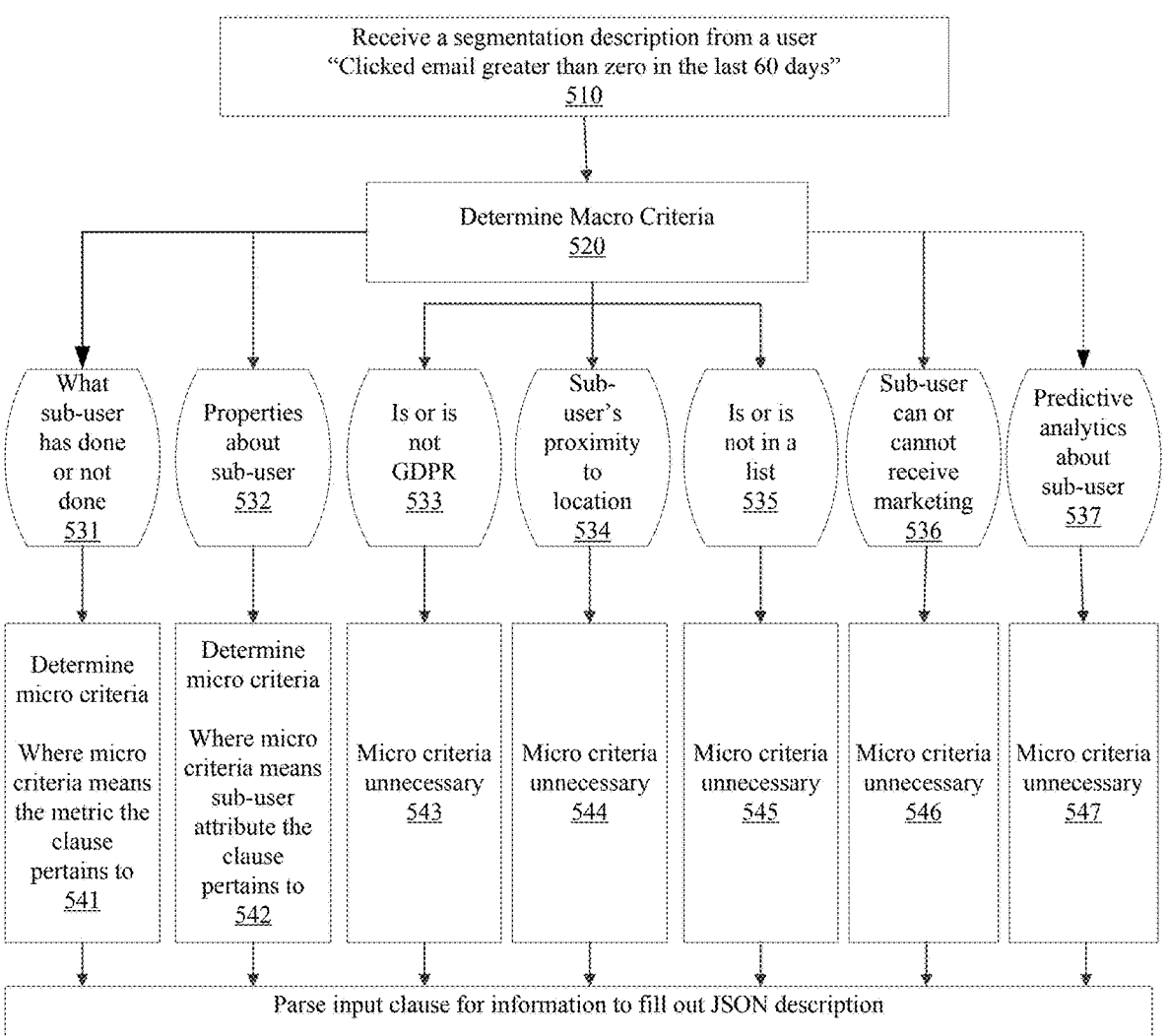
FIG. 5 is another flow chart that includes steps of another method for electronic categorization of sub-users of a database for receiving an electronic action, according to an embodiment.

FIG. 5 is another flow chart that includes steps of another method for electronic categorization of sub-users of a database for receiving an electronic action, according to an embodiment. A first step 510 includes the previously described step of receiving a segmentation description from the user. For example, the segmentation description may include "Clicked email greater than zero times in the last 60 days". A second step 520 includes determining a macro criteria (which is the previously described criteria).

A set of all possible macro criteria are depicted in 531, 532, 533, 534, 535, 536, 537. The set of macro criteria for the input segment description are determined in parallel. This set of criteria may exclude some of the possible criteria types or include multiple of the same type based on the input segment description.

Further, for an embodiment, micro criteria 541, 543, 543, 545, 546, 547 are determined which are additional refinements of the macro criteria. For some of the criteria, there are no additional refinements or micro criteria needed. Again, for an embodiment, any such micro criteria are determined in parallel.

Step 550 includes parsing information of the user data to fill out the JSON description. For an embodiment, the user data is parsed according to the criteria in parallel, parsing out all the details including any needed micro-criteria, filters, values, dates, etc. For an embodiment, in parallel, a LLM is used to gather all needed pieces of information to fill out the JSON description. For an embodiment, this includes fields, such as, 'value', 'operator', 'timeframe', etc. and depend on a macro criteria in question. For example, "Clicked Email greater than zero in the last 60 days"→Macro: What someone has done or not done→Micro: Clicked Email→Parse needed information.

As previously described, the electronic action can include sending an electronic message to sub-user of the user that are identified as sub-users of a segment by logically combining the representation of each criteria according to the logical statement. Accordingly, the described embodiments additionally solve practical problems associated with automatically generating by a server or computing apparatus electronic messages that are likely to solicit a response from recipients (sub-users) of the electronic messages. The electronic messages can include information to be conveyed to sub-users (recipients). The information can be related to anything, such as safety alerts (for example, to natural disasters, or criminal activity), wildfires, political events, etc. Further, the described embodiments further solve practical problems associated with automatically identifying messages and characteristics (including a behavior) of messages that are more or less likely to solicit the response from the recipients (sub-users). Further, the described embodiments further solve practical problems associated with tuning the generation and other characteristics of the electronic messages based on preferences and actions of users who input a description for the electronic messages and based on tracking and monitoring the actions of recipients (sub-users) of the electronic messages. The different electronic messages may include different content and/or behavior. For an embodiment, the behavior can include the behavior of the display of the different electronic messages being different. For example, the display of different electronic messages may include motion of the display of the electronic messages. Accordingly, based on the sensed behavior of recipients of the electronic messages, the display may selectively vary.

FIG. 6 shows a system for electronic message generation, according to an embodiment. As previously described, after categorizing or segmenting sub-users of the user, an electronic action is performed. As described, for an embodiment, the electronic action includes sending an electronic message to the identified sub-users. For an embodiment, the electronic message(s) are generated.

For an embodiment, the server 101 receives 611 from the user server 140 an input description from the user. For an embodiment, the input description includes a text input. For an embodiment, the text input is limited to a set number of characters. However, for at least some other embodiments, the input description includes more than text. For embodiment, the input description includes an email. For example, for an embodiment, the input description includes images, such as, an image of a product. For an embodiment, input description includes an image of an email. For an embodiment, the input description further includes user preferences, such as, color schemes, brand voice, fonts, etc.

For an embodiment, the server 101 further operates to scrape (615) characteristics of other electronic messages of the user including at least colors and fonts. For an embodiment, the scraping includes scraping branding characteristics of other electronic messages of the user including at least brand colors and brand fonts. For an embodiment, scraping, by the server, characteristics of other electronic messages of the user comprises scraping code of a current message of the user, scraping code of other messages of the users, and scraping code of one or more websites of the user. For an embodiment, the scraping includes code that identifies characteristics of text and images of the messages of the user, and/or a website of the user.

For an embodiment, the scraping provides a determination of preferences of the user. For example, scraping may be used to determine the color preferences of the user. An embodiment includes determining the N (for example, 6) colors that are the most important to the user, and therefore, important to a brand of the user. For an embodiment, the determination is based on scraping code of a current message of the user. For an embodiment, the determination is based on scraping code of other messages of the users. For an embodiment, the determination is based on scraping code of one or more websites of the user. For an embodiment, the color determination is directed to text or wording of the user. An embodiment includes making the determination by counting letters of the messages or websites allocated to each color. An embodiment includes making the determination by counting words of the messages or websites allocated to each color. An embodiment includes determining the top X (such as, two) common background colors. For an embodiment, this includes scraping the code of the messages or websites of the user to determine the percentage of the background that is allocated to each color. An embodiment includes determining the top selectable button colors. For an embodiment, this includes scraping the code of the messages or websites of the user to determine the percentage of the selectable buttons that are allocated to each color.

For an embodiment, the server 101 further operates to generate (616) N message sections based on the input description and the scraped branding characteristics. For an embodiment, this includes a text generation model which generates one or more generated electronic messages. The text generation model may include an LLM (large language mode) that receives the input description and the branding characteristics. The N messages can be provided to the user which the user can then select one or more of the N messages for generation of the electronic message. As described, for an embodiment the message section generator includes an LLM (large language model) that receives a textual input.

However, as described, the input description received from the user is not limited to text. The input description may include images as well. For an embodiment, the input description includes one or more images, and the message section generator includes a MMLLM (multi-model large language model). For an embodiment, the user feedback and sensed sub-user actions are used for training the MMLLM.

Further, for an embodiment, the text generation model is directed to follow marketing best practices like being concise, friendly, having a clear call to action, etc. For an embodiment, sensed sub-user (recipient) actions and sensed user actions are tracked and used to train the text generation model. Further, examples of well-written messages are used to help guide (train) the text generation model to generate the N message sections that look better or are more effective.

For an embodiment, the server 101 further operates to apply (618) colors, fonts, and applying, by the server, colors, fonts, and other formatting options to the generated N message sections based on the scraped characteristics. The formatting options may include a selectable button width, button border styles, a button border width, padding, a font line spacing, and/or a font size. For an embodiment, the formatting options include any setting that can be applied to control the appearance of a piece of text or other element of the message.

For an embodiment, the server 101 further operates to filter (620) the generated N message sections to eliminate message sections that include pre-identified undesired characteristics. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section.

For an embodiment, the server 101 further operates to display 622 the filtered electronic message sections to the user.

For an embodiment, the server 101 further operates to receive (624) feedback from the user regarding the displayed filtered electronic message sections. The feedback may include a selection of one or more of the N message sections. Further, the feedback may include updates which can be feedback to the text generation model. For an embodiment, the feedback may be user dependent. That is, different users may have different selection types. For an embodiment, the different selection types are feedback to the text generation model. That is, for an embodiment, the text generation by the text generation model is different for each user as defined by sensed or determined actions by each of the users.

For an embodiment, the server 101 further operates to electronically send the set of generated electronic messages to computing devices 104, 106 of sub-users 108, 112. For an embodiment, the sub-users 108, 112 have visited a website of the user.

FIG. 7 shows a process for generating an electronic message, according to another embodiment. FIG. 7 shows an example of an input description 710 to a message generator 730. Further, X examples of messages 720 that the user considers to be well-written and of a desired format can be provided to the message generator 730.

For an embodiment, the input description is a message as well, and for an embodiment, the server scrapes 740 the message of the input description, other messages (such as example messages 720), other identified messages of the user, and/or a website of the user. The scraping 740 may include identifying the majority of colors and fonts of the messages or websites. That is, code that generates the messages or the websites is scraped to identify the user of colors and/or fonts included within the messages or websites. Clearly, other features in addition to colors and fonts can be scraped.

For an embodiment, the message generator 730 generates N message sections. An embodiment then includes applying 750, by the server, colors, fonts, and other formatting options to the generated N message sections based on the scraped characteristics. The formatting can include button designs. That is, for an embodiment, the electronic messages include a selectable button when received by the recipient (sub-users). Different button designs and button locations are more or less likely to be selected. For an embodiment, the different button designs and button locations are part of the different content and behavior of the different electronic messages.

For an embodiment, the N message sections include JSON (JavaScript Object Notation) outlines. For an embodiment, formatting and post-processing 760 are applied to the JSON outlines. JSON is an open standard file format and data interchange format that uses human-readable text to store and transmit data objects consisting of attribute-value pairs and arrays. It is a commonly used data format with diverse uses in electronic data interchange, including that of web applications with servers.

For an embodiment, the filtered electronic message sections 771-773 are displayed (results shared 770) to the user. For an embodiment, the user may then select one or more of the filtered electronic message sections 771-773 to form one or more electronic messages to be delivered to the sub-users. As described, when the sub-users visit the website of the user, code is uploaded to the browser of the sub-user, thereby allowing the server to track and monitor the actions of the sub-users to allow for the identification of successful electronic messages, and accordingly, successful message sections.

FIG. 8 shows a system for electronic message generation, according to another embodiment. An embodiment further includes adaptively selecting 826 sub-users (such as, sub-users 108, 112 of computing devices 104, 106) to receive the generated electronic messages. An embodiment further includes adaptively selecting a timing of electronically sending the generated electronic messages. An embodiment further includes tuning the generation of the electronic messages. For an embodiment, the tuning is based on actions of the user, and/or actions of recipients (sub-users) of the electronic messages.

Selecting Sub-Users to Receive Generated Electronic Messages

As described, at least some embodiments include selecting (826) which sub-users are to receive the generated electronic messages. For an embodiment, the sub-users are selected using the previously described embodiments for identifying sub-users of a segment by logically combining the representation of each criteria according to the logical statement For an embodiment, the sub-users are selected based on the type of computing device associated with the sub-user. Further, as described, for an embodiment, sub-users are adaptively selected to receive the generated electronic messages based on monitoring, sensing, or tracking of response of recipients (sub-users) of the electronic messages. That is, some recipients (sub-users) are more likely to perform an action based on receiving the generated electronic messages. For an embodiment, the sensing of the actions of the recipients is used to adaptively select which of the generated electronic messages to electronically send to each recipient. An embodiment includes adaptively selecting a list of sub-users for receiving the generated electronic messages based on sensed action of sub-users that receive the generated electronic messages. Past actions of each of the sub-users can be used to adapt the list of sub-users to receive future generated electronic messages.

For an embodiment fine tuning the generated electronic messages includes adaptively adjusting the recipients of the generated electronic messages based on the sensing the actions of the recipients of the generated electronic messages. That is, different recipients can be selected for different of the generated electronic messages. For each of the generated electronic messages a list of sub-user recipients for each can be adaptively adjusted based on the sensed actions of the recipient sub-users. For an embodiment, fine tuning the generated electronic messages includes adaptively adjusting a distribution of generated electronic messages amongst the sub-users.

Selecting a Timing of Electronically Sending the Generated Electronic Messages

As described, at least some embodiments include selecting 827 a send time of one or more of the generated electronic messages. For an embodiment, multiple of the generated electronic messages can be electronically sent to sub-users simultaneously. For example, a set of sub-users may be determined to be likely to respond to a particular type of electronic message. For an embodiment, the electronic messages may be sent to different sub-users at different times. For example, the sensing of action of recipients (sub-users) of the electronic messages can be used to adaptively adjust the timing of the sending of future electronic messages. For example, some sub-users may be adaptively determined to have performed an action based on receiving the electronic message versus some other sub-users. Accordingly, the timing of the electronic messages being sent may be adaptively adjusted based on the sensing of the actions of the recipient (sub-users) of the electronic messages. For an embodiment, a first electronic message may be sent at a first time, and a second electronic message may be sent at a later time. The sequence of the timing of the sending of the first electronic messages and the second electronic messages may be used to determine which of the first electronic messages or the second electronic messages are more effective for each sub-user.

Tuning the Generation of the Electronic Messages

As described, at least some embodiments include sensing sub-user action based on receiving the generated electronic messages. The sensing may include sensing of any action performed by the recipient (sub-user) based on receiving the generated electronic messages.

At least some embodiments further include adjusting, by the server, the set of generated electronic messages including tuning 828 the generated electronic messages based on sensing actions of the recipients of the generated electronic messages. For an embodiment, different versions of the generated electronic messages are sent to different sub-user recipients. Based on the sensed actions of the sub-user recipients, certain versions are favored over other versions. That is, the versions that caused an action to be performed by the recipient sub-user can be categorized as more effective in causing action by the recipient. The different versions of the generated electronic messages can be determined by the text of the generated electronic messages based on the text.

Over time, the actions of the recipients are learned, and what variation of the different types of electronic messages work the best is learned. For an embodiment, this can further include tuning to identify the importance of the text of the messages, how to condense the text, and how to draft the generated electronic messages.

As previously described, at least some embodiments include selecting a send time of one or more of the generated electronic messages. For an embodiment, multiple of the generated electronic messages can be electronically sent to sub-users simultaneously. For example, a set of sub-users may be determined to be likely to respond to a particular type of electronic message. For an embodiment, the electronic messages may be sent to different sub-users at different times. For example, the sensing of action of recipients (sub-users) of the electronic messages can be used to adaptively adjust the timing of the sending of future electronic messages. For example, some sub-users may be adaptively determined to have performed an action based on receiving the electronic message than some other sub-users. Accordingly, the timing of the electronic messages being sent may be adaptively adjusted based on the sensing of the actions of the recipient (sub-users) of the electronic messages. For an embodiment, a first electronic message may be sent at a first time, and a second electronic message may be sent at a later time.

At least some embodiments include condensing details of at least a word string or phrase of the prioritized text. For an embodiment, condensing the details include identifying at least one word string or phrase, an introductory catch phrase, key details of the promotion (percent off, offer deadline, promo code, product details), a single call to action phrase (ex. "Buy now"). For an embodiment, condensing comprises filtering/eliminating text of the at least text that is not associated with the identified word string or phrase. For an embodiment, the identified word string or phase is identified from a subject line of the first channel electronic message. For an embodiment, filtering the at least text includes filtering text of the machine-encoded text that is not similar to the text of the subject line. For an embodiment, higher-priority text is kept, and lower-priority text is filtered out. As described, the priority of the text can be determined by a similarity of the text with the subject line. For an embodiment, the priority is additionally or alternatively based on a spatial location of the text within the first channel electronic message. For an embodiment, the priority is additionally or alternatively based on size of the text within the first channel electronic message. For an embodiment, the filtering is based on prioritization of the text including identifying key parts of the text of the first channel electronic message. Such parts can be extracted, such as, an introduction, call to action phrase ("click here", "shop t shirts"), and/or 1-3 supporting details ("sale ends Friday", "10% off shirts").

An embodiment further includes managing, by the server, the set of generated electronic messages includes fine tuning the generated electronic messages based on sensing actions of a user in response to the generated electronic messages. As previously described, for an embodiment, the server 101 that is connected through an electronic network 114 to at least a user server 140 of the user. For an embodiment, the user server 140 manages a website of the user. Further, as described, the server 101 receives 111 from the user server 140 the first channel electronic message, wherein the first channel electronic message includes a formatted message that includes at least text. For an embodiment, the user can review the electronic messages before the electronic messages are electronically sent to the sub-users. During this review, the user can edit or modify the electronic messages before being sent to the sub-users. These actions during the review of the electronic messages can be used to adaptively adjust future electronic messages based on monitoring the actions of the user.

Figure 9:
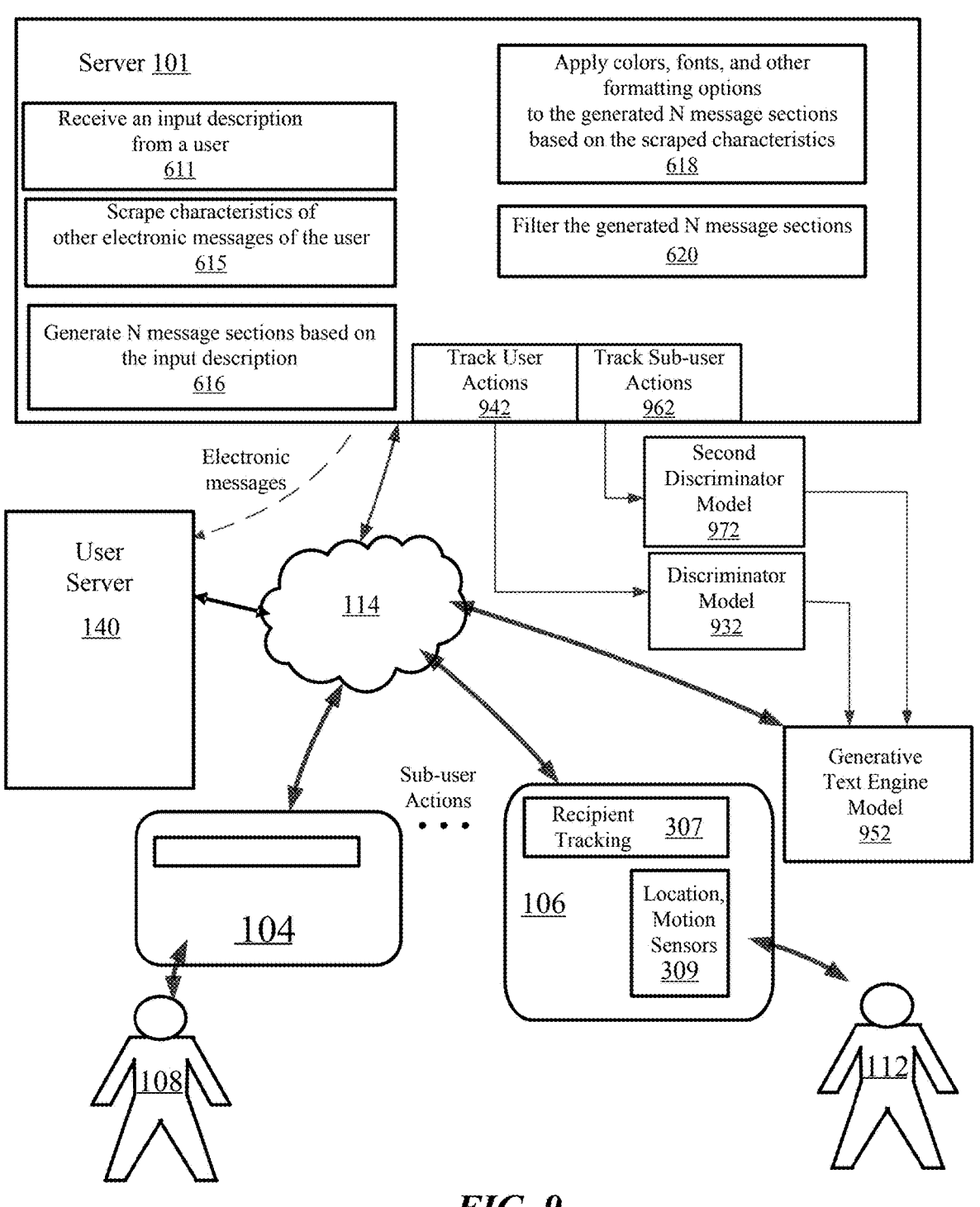
FIG. 9 shows a system for electronic message generation, according to another embodiment.

FIG. 9 shows a system for electronic message generation, according to another embodiment. For an embodiment, a discriminator model 932 operates to assign a quality rating for each of the electronic messages based on the identified (tracked) user actions 942. For an embodiment, the discriminator model 932 is provided with examples of electronic messages and whether or not a user clicked on, engaged with, or is inspired from (such as writing copy that is similar to), or performed some other action showing interest in a generated electronic message. This allows the discriminator model 932 to predict whether or not a user will find an electronic message that the generator comes up with to be of high-quality and based on the discriminator's predicted probability that the user will approve the electronic message. For an embodiment, the X electronic messages with the highest X "quality ratings" can be chosen and then those X electronic messages can be shown to the user since these electronic messages are the "best" of the group of electronic messages. For an embodiment, the worst performing electronic messages can also be used by the discriminator model 932.

For an embodiment, different tracked user actions suggest a different level of quality of each of the electronic messages. Accordingly, different specific actions, and/or combinations of actions performed by the user on the displayed electronic messages can yield a different ranking of the electronic messages.

For an embodiment, the discriminator model 932 is trained on historically tracked user actions on previously generated electronic messages, wherein the historical users actions include selection, editing, and actual use of an electronic message. For an embodiment, the trained historical model is equipped to assign a quality rating to new, previously unseen electronic messages after the electronic messages have been generated, allowing selection of the predicted top-performing electronic messages to display to the user.

For an embodiment, a second discriminator model 972 assigns a second quality rating for each of the electronic messages displayed to the one or more recipients (sub-users) based on the tracked sub-user actions 962. For an embodiment, the rankings of the sub-user actions influence the quality rating of each of the electronic messages. For an embodiment, the second discriminator model 972 is trained on historically tracked recipient (sub-user) actions on previously generated electronic messages, including opening of and clicks in the electronic messages. With this training the model assigns a quality rating to new, previously unseen electronic messages after the electronic messages have been generated, allowing selection of the predicted top-performing electronic messages to display to the user.

At least some embodiments further include continuously updating the generative text engine model 952 based on continuously generated second quality ratings as determined by the second discriminator model 972.

For an embodiment, the discriminator model 932 and the second discriminator model 972 both simultaneously provide quality ratings of electronic messages for the generative text engine model 952. For an embodiment, discriminator models 932, 972 can be used together to create a conclusive quality rating by for example creating a weighted sum of the outputs of the two models. For an embodiment, one of the discriminator models has a greater influence on the quality rating than the other of the discriminator models. For example, when a quality rating of one of the discriminator models suggests a very high quality (greater than a predetermined threshold) then that discriminator model provides the dominant quality rating. For example, the actions of the user may indicate one electronic message to have a high quality. However, the recipient (sub-user) action may indicate that one other electronic message is substantially better (greater than the predetermined threshold). For an embodiment, the recipient (sub-user) actions provide a better electronic message quality indication than the user actions. Accordingly, in this case, the second discriminator model 972 has a greater influence on the quality of the electronic message than the discriminator model 932.

For an embodiment, the discriminator 932 and the second discriminator 972 are combined to form a single discriminator model that is trained using data consisting of both user and recipient (sub-user) actions.

FIG. 10 shows a system for electronic message generation, according to another embodiment. As previously described, for an embodiment, the server 101 operates to filter the generated N message sections to eliminate message sections that include pre-identified undesired characteristics. As shown, the embodiment of FIG. 10 further includes a filtering discriminator model 1062 which can operate to facilitate the filtering of the generated N message sections. For an embodiment, the previously described identified user actions are used to improve (train) the operation of filtering discriminator model 1062. For an embodiment, the training adds style or branding of the user per feedback as to electronic messages that have higher scoring or ranking due to user actions, such as, clicks/conversions/etc. For an embodiment, this can be tailored to the user, the type of message, or the recipient (sub-user). For an embodiment, multiple electronic messages can be A/B tested to determine the better performing electronic message. For this embodiment, the previously described identified recipient (sub-user) actions are used to improve (train) the operation of filtering discriminator model 562.

Figure 11:
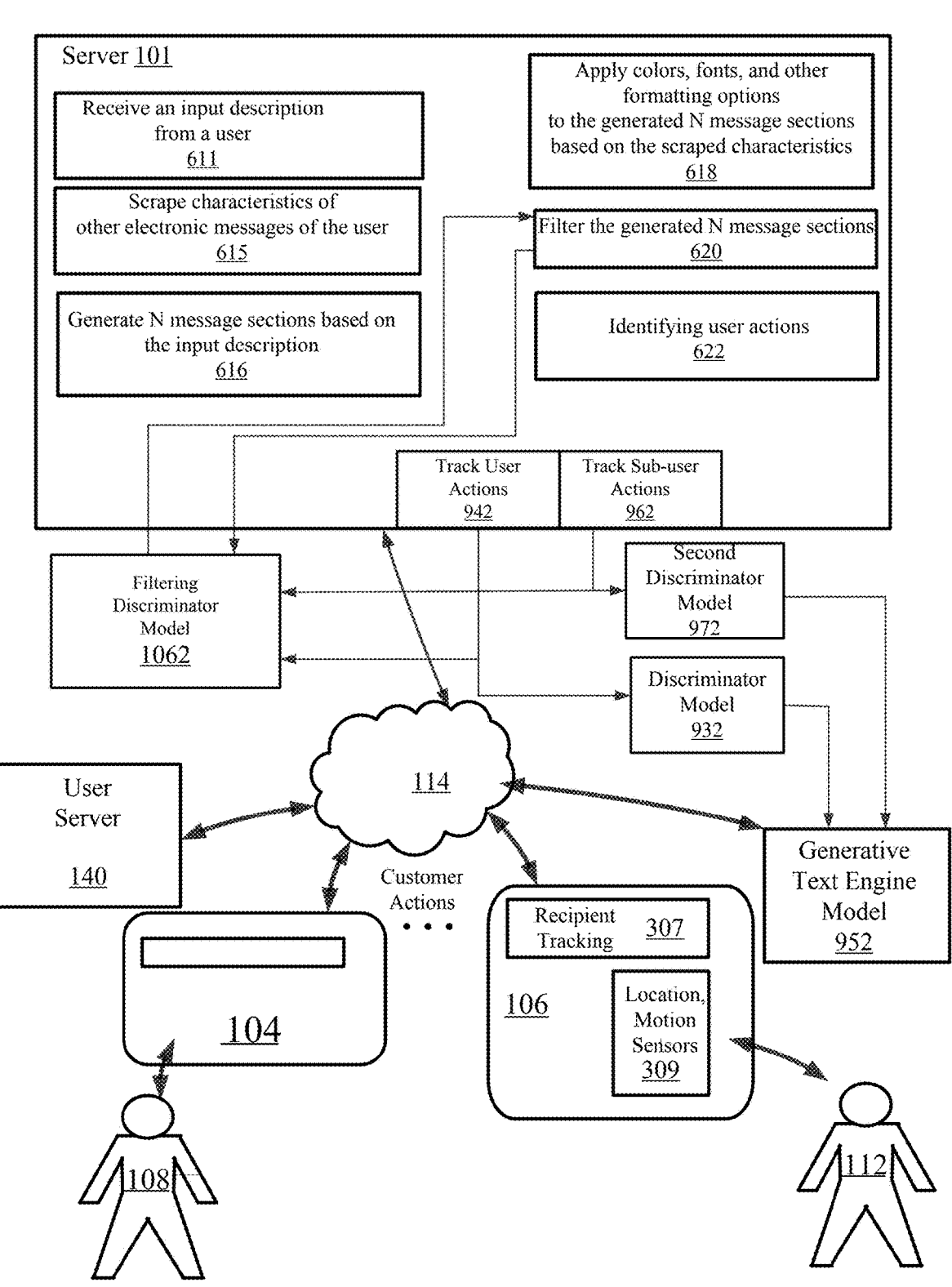
FIG. 11 shows a system for electronic message generation, according to another embodiment.

FIG. 11 shows a system for electronic message generation, according to another embodiment. This embodiment includes the discriminator model 932, the second discriminator model 972, and the filtering discriminator model 1062.

Figure 12:
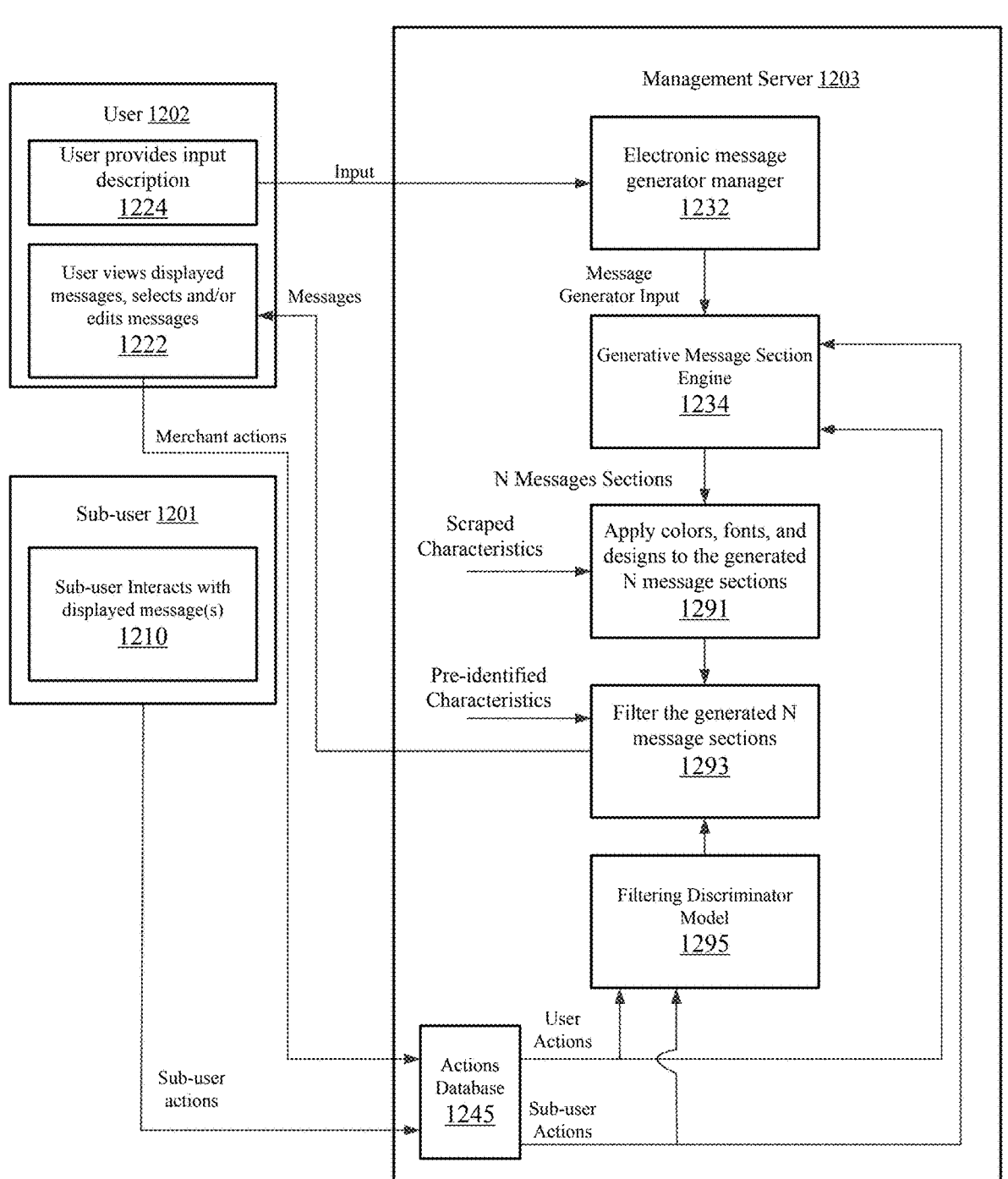
FIG. 12 shows a system for electronic message generation, according to another embodiment.

FIG. 12 shows a system for electronic message generation, according to another embodiment. As shown, for an embodiment, a user of a user server 1202 may provide an input description 1224. The input description 1224 may be additionally processed and then received by an electronic message generator manager 1232 of a management server 1203 for input to a generative text engine 1234.

As previously described, for an embodiment, the server (management server 1203) is configured to scrape characteristics (such as, branding characteristics) of other electronic messages of the user including at least brand colors and brand fonts. As described, the server may further scrape websites of the user for the characteristics.

For an embodiment, the generative text engine 1234 provides textual outputs of the N message sections based on the input description from the user and the scraped characteristics. For an embodiment, the input description provides information about the electronic messages the user would like to generate, including, for example, a short description of the electronic message the user wants to send, and a bit of metadata about an electronic campaign the user wants to launch. This information is fed into the generative text model. For an embodiment, the textual outputs are in the form of the N electronic message sections that can be the basis for electronic messages of a marketing message of the user of the user server 1202.

As previously described, for the embodiment, the management server 1203 further operates to apply (1291) colors, fonts, and designs to the generated N message sections. For an embodiment, this application may be bypassed or eliminated. For an embodiment, this includes applying colors, fonts, and applying, by the server, colors, fonts, and other formatting options to the generated N message sections based on the scraped characteristics. The formatting options may include a selectable button width, button border styles, a button border width, padding, a font line spacing, and/or a font size. For an embodiment, the formatting options include any setting that can be applied to control the appearance of a piece of text or other element of the message.

As previously described, for the embodiment, the management server 1203 further operates to filter (1293) the generated N message sections to eliminate message sections that include the pre-identified undesired characteristics. For an embodiment, this includes filtering the generated N message sections to eliminate message sections that include pre-identified undesired characteristics. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section.

For an embodiment, after filtering the generated N message sections, the generated messages or messages based on the generated messages are displayed 1222 to the user. The user views the displayed messages and can then select or edit the generated and displayed electronic messages. For an embodiment, the monitored user actions are stored in a monitored actions database 1245. Different actions by the user provide different levels of interest in the displayed electronic messages, and accordingly, can influence a ranking of the quality of each of the displayed electronic messages. For an embodiment, a discriminator model receives the user actions, ranks the electronic messages (message sections) based on the monitored user actions, and provides quality ranking data of the generated electronic messages back to the generative text engine 1234. Accordingly, the electronic messages generated by the generative text engine 1234 will improve over time as more generated electronic messages are ranked and the quality of each of the generated electronic messages is feedback to the generative text engine 1234.

Additionally, for an embodiment, a sub-user 1201 of the user 1202 is provided with electronic messages that are based on the electronic messages provided to the user 1202. The user may provide messages as received, or the user may modify the originally generated electronic messages. Either case, the electronic messages are displayed to the recipient (sub-user). For an embodiment, this includes sending a user device one or more electronic messages.

The recipient (sub-user) may then act upon the receiving and displaying of the electronic message(s) 1210. For an embodiment, the recipient (sub-user) actions based on the displayed electronic message(s) are monitored. For an embodiment, the recipient (sub-user) actions are stored in the action database 1245. For an embodiment, a second discriminator model generates a quality rating for each of the displayed electronic messages based on the previously described different recipient (sub-user) actions. For an embodiment, the quality rating of each of the electronic messages is feedback to the generative text engine 1234 to additionally influence the generation of the electronic messages.

As previously described, for an embodiment, a filtering discriminator model 1295 operates to reduce the number of electronic messages before the electronic messages are displayed to the user 1202. For an embodiment, quality ratings of the user actions and/or recipient (sub-user) actions are used to improve the filtering of the filtering discriminator model 1295. That is, for example, the filtering of the electronic messages is performed such that the electronic messages having lower quality are filtered out before being displayed to the user of the user server 1202 and/or the recipient (sub-user) device 1201. The filtering 1293 may be supplemented with the filtering control of the filtering discriminator 1295. Accordingly, the filtering 1293 may be supplemented based on the monitoring of user and sub-user actions.

FIG. 13 is a flow chart that includes steps of a method for electronic message generation, according to an embodiment. A first step 1310 includes receiving, by a server, an input description from a user. The server then may receive a message generation request from the user. A second step 1320 includes scraping, by the server, characteristics of at least one electronic message of the user including at least colors and fonts. A third step 1330 includes generating, by the server, N message sections based on the input description. A fourth step 1340 includes applying, by the server, colors, fonts, and other formatting options to the generated N message sections based on the scraped characteristics. A fifth step 1350 includes filtering, by the server, the generated N message sections to eliminate message sections that include pre-identified undesired characteristics. A sixth step 1360 includes displaying, by the server, the filtered electronic message sections to the user. A seventh step 1370 includes receiving, by the server, feedback from the user regarding the displayed filtered electronic message sections.

Input Description

For an embodiment, the input description includes a text input. For an embodiment, the text input is limited to a set number of characters. However, for at least some other embodiments, the input description includes more than text. For embodiment, the input description includes an email. For example, for an embodiment, the input description includes images, such as, an image of a product. For an embodiment, input description includes an image of an email. For an embodiment, the input description further includes user preferences, such as, color schemes, brand voice, fonts, etc. For an embodiment, the input description can additionally include background images that the message section generator can generate and overlay text to be overlaid on top of the background images.

For an embodiment, the image can include figures, drawings, pictures, etc., but further includes at least some text embedded into the image. For an embodiment, the text of the image is not computer readable. For an embodiment, the server 101 further operates to extract and prioritize the at least text of the image of the input description. That is, the text of the image is extracted from the image. The extracted text is then prioritized based on, for example, the position or location of the text within the image. For an embodiment, the input description can include input data that has worked well in the past in generated electronic messages the solicit feedback from recipients (sub-users). For example, if it was determined that electronic messages in the past that included bright-colored buttons worked very well (high rate of responses from recipients, then the input description may be selected to include an instruction to use bright-colored buttons.

For an embodiment, the server operates to extract and prioritize the text of the image by converting the at least text of the image of the input description into machine-encoded text, and then prioritizing the text of the machine-encoded text based on at least a size and placement of the text of the image. For an embodiment, converting the image of the first channel electronic message includes applying optical character recognition (OCR) to the image. OCR is a technology that recognizes text within a digital image. OCR may be used to recognize text in scanned documents and images. OCR software can be used to convert a physical paper document, or an image into an accessible electronic version with text.

For an embodiment, an OCR algorithm is configured to determine coordinates of a box that includes the text.

Scraping Characteristics

For an embodiment, scraping, by the server, characteristics of other electronic messages of the user comprises scraping code of a current message of the user, scraping code of other messages of the user, and/or scraping code of one or more websites of the user. For an embodiment, the scraping includes code that identifies characteristics of text and images of the messages of the user, and/or a website of the user.

For an embodiment, the scraping provides a determination of preferences of the user. For example, scraping may be used to determine the color preferences of the user. An embodiment includes determining the N (for example, 6) colors that are the most important to the user, and therefore, important to a brand of the user. For an embodiment, the determination is based on scraping code of a current message of the user. For an embodiment, the determination is based on scraping code of other messages of the user. For an embodiment, the determination is based on scraping code of one or more websites of the user. For an embodiment, the color determination is directed to text or wording of the user. An embodiment includes making the determination by counting letters of the messages or websites allocated to each color. An embodiment includes making the determination by counting words of the messages or websites allocated to each color. An embodiment includes determining the top X (such as, two) common background colors. For an embodiment, this includes scraping the code of the messages or websites of the user to determine the percentage of the background that is allocated to each color. An embodiment includes determining the top selectable button colors. For an embodiment, this includes scraping the code of the messages or websites of the user to determine the percentage of the selectable buttons that are allocated to each color. For an embodiment, this includes determining the number of words or the total number of words that are a color or font. For an embodiment, this includes determining the number of letters of the total number of letters that are of a color or font. For an embodiment, an electronic message rendering system of the server includes programming code operative to count the number of letters with each color. For an embodiment, the rendering system takes all the code and settings provided by the user and creates an electronic message/message section that is similar to what the recipient (sub-user) would see.

Generating N Message Sections

For an embodiment, this includes a text generation model which generates one or more message sections. The text generation model may include an LLM (large language model) that receives the input description and the branding characteristics. The N messages can be provided to the user which the user can then select one or more of the N messages for generation of the electronic message. As described, for an embodiment the message section generator includes an LLM (large language model) that receives a textual input. However, as described, the input description received from the user is not limited to text. The input description may include images as well. For an embodiment, the input description includes one or more images, and the message section generator includes a MMLLM (multi-modal large language model). For an embodiment, the user feedback and sensed sub-user actions are used for fine tuning the LLM/MMLLM. For an embodiment, the input description includes an image, and the message section generator edits the input image by generating a background and/or text to be associated with the image. For example, the user may input a product image and the message section generator generates a background and text for the product image.

Applying Colors, Fonts, and Other Formatting Options

For an embodiment, the server operates to apply colors, fonts, and other formatting options to the generated N message sections based on the scraped characteristics. The formatting options may include a selectable button width, button border styles, a button border width, padding, a font line spacing, and/or a font size. For an embodiment, the formatting options include any setting that can be applied to control the appearance of a piece of text or other element of the message.

Filtering the Generated N Message Sections

For an embodiment, the server operates to filter the generated N message sections to eliminate message sections that include pre-identified undesired characteristics. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section. For an embodiment, the filtering can be supplemented with a filter discriminator that additionally controls the filtering based on sensed action of the user and/or the sub-users. For example, the scraped characteristics might indicate that a certain percentage of the text of the user messages are blue. An embodiment includes identifying types of messages (sale, product launch, newsletter, etc.) to use what characteristics. For example, the scraping might indicate to always use red square buttons for sale emails, but blue rounded buttons for newsletter emails. An embodiment includes ranking the message sections in addition to filtering based on sub-user actions. For an embodiment, the post-processing corrects a problem that has been identified and then can still displayed to a sub-user. However, for an embodiment, filtering eliminates a message section that includes such a problem.

Displaying the Filtered Electronic Message Sections

For an embodiment, the server operates to display the filtered electronic message sections to the user.

Receiving Feedback from the User

For an embodiment, the server operates to receive feedback from the user regarding the displayed filtered electronic message sections. The feedback may include a selection of one or more of the N message sections. Further, the feedback may include how the sub-user edits the message sections, written feedback, thumbs up and/or thumbs down-type rating which can be feedback to the text generation model. For an embodiment, the feedback may be user dependent. That is, different users may have different selection types. For an embodiment, the different selection types are feedback to the text generation model. That is, for an embodiment, the text generation by the text generation model is different for each user as defined by sensed or determined actions by each of the users.

For an embodiment, the server operates to electronically send the set of generated electronic messages to computing devices of sub-users. For an embodiment, the sub-users 108, 112 have visited a website of the user.

Electronic Message Formation

An embodiment further includes generating electronic messages for the user based on the filtered electronic message sections. For an embodiment, the user selects one or more of the filtered electronic message sections to form one or more electronic messages. That is, the user may select one of the filtered electronic message sections as an electronic message, or the user may configure an electronic message out of a combination of the filtered electronic message sections. The user may indicate a preference for one or more of the filtered electronic message sections. The user may indicate a lack of preference for one or more of the filtered electronic message sections. Further, the user may edit and select one or more of the filtered electronic message sections. Based on feedback from the user, the server may operate to select, adjust, or eliminate at least some of the electronic message sections. Further, the user can create a message that is a mix of generated message sections and other message sections that the user creates.

Communicating Electronic Messages to Sub-Users (Recipients)

For an embodiment, the electronic messages are electronically sent to sub-users. For an embodiment, the sub-users have accessed a website of the user.

Post Processing

At least some embodiment further includes post-processing the generated N message sections. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section.

For an embodiment, when post-processing of one or more of the N message sections is not possible, then the one or more N message sections are eliminated or filtered out. For an embodiment, the post-processing includes fixing issues in which a clear and unambiguous fix can be applied. Again, for an embodiment, if a fix does not exist, then the message section with the issue is eliminated or filtered.

For an embodiment, the application of the post-processing ensures that colors of the message section have sufficient (greater than a preselected threshold) contrast. For an embodiment, the post-processing removes non-allowed html tags from text (for example, there are some HTML tags that could be undesirable. For example, the message section generator could create a button tag inside of a text block, which can be confusing). For an embodiment, the post-processing removes attributes of tags if any were written by a generator of the message sections. For an embodiment, the post-processing removes empty columns of a multi-column layout.

As described, for an embodiment, the post-processing attempts to fix issues identified after the generation of the N message sections based on the input description. For an embodiment, issues that cannot be resolved are eliminated. That is, an embodiment includes eliminating electronic message sections that include characteristics that have been previously identified as improper.

At least some embodiments further include updating the generating of the N message sections based on the feedback from the user. For an embodiment, the feedback from the user includes selections of one or more of the message sections which are then incorporated into an electronic message that can be delivered to one or more sub-users. The selections, however, show preferences for selected of the N message sections. These preferences can be feedback to a generator of the message sections to train the generator in the generation of future messages.

For an embodiment, the message generator generates one or more rough designs of the message sections and the server is configured to display the one or more rough designs. Subsequently, the server allows the user to give feedback and guide the message sections creation process, and/or allow the user to use the generator to iterate on designs of the message sections after the message sections are created, which could be fed back to the message section generator. For an embodiment, the message section generator includes at least one model, and the feedback from the user is used to update the one or more models. For an embodiment, over time, the server is configured to customize to each user based on what the user liked and didn't like (via feedback button, and/or via what the user did or did not choose to insert, or based on how the chose to edit one or more of the message sections. For an embodiment, the server is configured with the message section generator to customize generated content based on how users respond to prior content from that brand shown to the user by the model.

As described, for an embodiment, the server is configured to display the filtered and post-processed electronic message sections to the user. For an embodiment, up to M (for example, 3) of the remaining generations are then shown to the user via a carousel preview in the model. If the user likes one of the M options, then the user can select "Insert draft" and the selected section will be inserted into an electronic message of the user. Alternatively, the user can go back to the section description and attempt to update their description and regenerate M new options. Once completed, the electronic message is electronically sent to sub-users of the user.

For an embodiment, a separate, rules-based approach is applied to select, for example, the color palette, the header and body fonts, and the button-design applied to each of the generated sections. For an embodiment, the color palette is provided to the message section generator. The rule-based approach ensures that the eventual electronic message will have a sufficient color contrast to meet web accessibility guidelines and aesthetics.

As described, for an embodiment the message section generator includes an LLM (large language model) that receives a textual input. However, as described, the input description received from the user is not limited to text. The input description may include images as well. For an embodiment, the input description includes one or more images, and the message section generator includes a MMLLM (multi-model large language modal). For an embodiment, the user feedback and sensed sub-user actions are used for training the MMLLM.

As described, the feedback from the user can be used as the basis for one or more electronic messages that are sent to recipients (sub-users). For an embodiment, the one or more electronic messages are each formed by the user selections of one or more of the generated message sections. That is, an embodiment includes generating electronic messages for sending to sub-users based on the filtered electronic message sections. The user may select a single message section as an electronic message, or the user may select multiple messages sections as a single electronic message.

At least some embodiments include electronically sending the electronic messages to sub-users of the users. At least some embodiments include monitoring and tracking, by the server, responses of the sub-users to receiving the electronic messages, determining, by the server, a level of success of each of different of the electronic messages, and updating the generating of the N message sections based on the determined level of success of each of different of the electronic messages. As described, for an embodiment, the sub-users have visited a website of the user. Further, for an embodiment, when the sub-user loads a webpage, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored.

As described, the monitoring of the sub-user actions can be used to determine a level of success of each of the electronic messages that were generated by the message sections. Accordingly, the value or success of each of the electronic messages and the corresponding message sections can be determined. For an embodiment, updating the generating of the N message sections includes feeding back the level of success of each of the different electronic messages to a generator that generated the N message sections.

Further, for an embodiment, different variations of the electronic messages can be tested against each other to allow a determination of what adjustments or parameter selections associated with the generation of the message sections and the electronic messages are more successful in soliciting a response from the recipient (sub-users). An embodiment further includes suggesting, by the server, two or more versions of the electronic messages, electronically sending the two or more versions of the electronic messages to sub-users, monitoring actions of the sub-users in response to receiving the two or more versions of the electronic messages and ranking the two or more versions of the electronic messages based on the monitored actions.

As previously described, the different variations may include different textual content, different color schemes, different layouts, different imagery, different send times, different lists of recipients, and/or different combinations of selected message sections. For an embodiment, the actions of the recipients (sub-users) of the different variations of the message sections and form electronic messages are tracked to determine which of the variations are more successful in soliciting responses of the recipients (sub-users). The success of the different responses can be ranked, and the ranking can be used to select the variations of future message sections and form electronic messages. That is, for an embodiment, the generator of the message section is trained based on the ranking of the two or more versions of the electronic messages. The ranking may influence the full management system that includes the message section generator.

FIG. 14 shows electronic messages, wherein each electronic message includes different content or behavior, according to an embodiment. For an embodiment, a display 1410 of an electronic message 1406 includes an input from a recipient (sub-user (site visitor), and an electronic message 1408 that provides a user input through, for example, a selection, such as, through a mouse click. A display 1420 includes an electronic message 1409 that changes positions on the display between times t1 and t2, and an electronic message 1411 that "pops up" a time t3 after the electronic message 1411 has been loaded. Clearly, other electronic messages having different content and behavior can be utilized. As shown, for an embodiment, the different electronic messages operate to control a display of the electronic messages on a display of a computing device (such as, computing devices 104, 106) of sub-users (such as, recipients) 108, 112). As stated, for an embodiment, the different electronic messages provide the electronic communications of the A/B testing.

For an embodiment, the electronic message includes a file configured to receive an input from a recipient of the electronic message. For an embodiment, the required input includes at least one or more of the recipients clicking to a different page, or the recipient entering information. For an embodiment, the electronic message is distinct from an underlying website which may include a dynamic and interactive page. For an embodiment, the electronic messages are distinct from the underlying website because the electronic messages appear visually and/or behaviorally distinct from the underlying page. For example, the behavior of the electronic message may include the electronic message popping up after the page is loaded or sliding out from the side after the rest of the page has been loaded. As previously described, the different templates of the A/B test control the behavior of the electronic message, and accordingly, control the display of a recipient of the electronic message.

Templates of Electronic Messages

For an embodiment, A/B testing includes N variations (arms) of templates that define electronic messages. For an embodiment, each of N templates includes a set of data objects that combine to represent a structure of an electronic message. As described, the first and second templates of the N templates of the electronic message each have a different content, a different send time, and/or a different behavior. The different displays of the mobile message can include a changing display, such as, movement or varying display intensity. Accordingly, the set of data objects of each of the first and second templates combine to represent a structure of electronic messages having a different content, different send times, or different behavior of the mobile messages. For an embodiment, the structure of the electronic message includes the content, the send time, or the behavior control.

For an embodiment, the templates additional include information pertaining to testing of the mobile message(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the messages 1406, 1408, 1409, 1411 may be electronic messages. For an embodiment, the electronic messages require an input. A first display of a computing device of an electronic message recipient includes an electronic message 1406 that requires an input from a user (electronic message recipient) and an electronic message 1408 that requires a user input through, for example, a selection, such as, through a click. A second display includes an electronic message 1409 that changes on the display between times t1 and t2, and an electronic message 1411 that is delivered a time t3 after the electronic message has been sent. Clearly, other electronic messages having different content, send times, and behavior can be utilized. For an embodiment, templates that have different send times are sent to the electronic message recipients at different times. For an embodiment, a different send time of the first template and the second template include a first send time for the first template and a second send time of the second template. For an embodiment, messages received at different times during the day may be more or less likely to achieve success, based on trends observed in both electronic messages and email. That is, electronic message recipient behavior can be observed by prior electronic messages to the electronic message recipient, or other types of electronic mail sent to the electronic message recipient. Based on the observer (sensed) prior behavior of the electronic message recipient, the first and second send times can be selected. Further, there can be legal restrictions on send times, which influence the times the server selects for the first and second send times.

For an embodiment, the electronic message includes a file configured to receive an input from an electronic message recipient. For an embodiment, the required input includes at least one or more of the customers (site visitor) clicking to a different page, or the customer entering information. However, as previously mentioned, sensors of mobile devices of the electronic message recipients can be utilized to determine or detect actions of the electronic message recipients that indicate changes in behavior of the electronic message recipient due to receiving the electronic messages of the different templates.

An embodiment includes counting the successes of the electronic message sent to electronic message recipients of, for example, a group 1 and a group 2 according to a template 1 and a template 2. As previously described, for an embodiment, successes of the electronic messages generally include determining how many of the electronic message recipients of the electronic messages are sensed and tracked or determined to have performed a task of the electronic message. For an embodiment, the tracked and monitored activities of the electronic message recipients are online activities. For an embodiment, mobile devices of the electronic message recipients are tracked, and the tracked and monitored activities include locations and motions of the electronic message recipients.

For an embodiment, the electronic message recipients are obtained by tracking information of electronic message recipients to the user website managed by the user of the user server 140. For an embodiment, the electronic message recipients include recent electronic message recipients. For an embodiment, recent electronic message recipients include electronic message recipients that have visited the user website within a predetermined time-period. For an embodiment, electronic message recipients include a selected number of most recent user website visitors. For an embodiment, recent site visitors include electronic message recipients since a specific event. For an embodiment, the specific event may include, for example, a large change in the settings of a template test. For an embodiment, the assignment is random with equal probabilistic distributions within each geographical region that the test is sent to. For example, the electronic message may be sent to electronic message recipients from N different geographical regions. For an embodiment, an equal number (or near equal) of electronic messages is sent to each of the geographical regions, but randomly sent to the electronic message recipients within each of the regions. For an embodiment, the assignment is deterministic but equally distributed within each of the geographical regions. For example, a first template 1 can be assigned to a first member of the list of planned electronic message recipients, a second template 2 can be assigned to a second member of the list of planned electronic message recipients, and the first template can be assigned to a third member of the list of planned electronic message recipients, and so on.

For at least some embodiments, an eligibility of the electronic message recipient is determined dynamically by a combination of a geolocation of the electronic message recipient, transactional (for example, purchase confirmation, delivery confirmation) vs. marketing purpose of the electronic message, and recency of the last electronic message received. For example, only electronic message recipients who have not received a marketing email and/or marketing electronic message within the past 24 hours (or some other predetermined or adaptive time period X) are eligible to receive this message. For an embodiment, the planned electronic message recipients are determined when an electronic message is scheduled for transmission to the electronic message recipients. For an embodiment, when the electronic message is sent, the time that each planned electronic message recipient received their most recent marketing electronic message is determined, and only those electronic message recipients that have not received an electronic message in the past X hours are deemed eligible electronic message recipients.

For an embodiment, content in the template(s) is dynamically updated based on actions or characteristics of the sub-user (recipient). For example, different images or content of electronic messages of the templates are sent to the electronic message recipients based on the last product that an electronic message recipient browsed. Further, the mobile devices of the electronic message recipients can be tracked and monitored. For an embodiment, the content of the templates is additionally updated by physical location and activities of the electronic message recipients. The physical location and the activities can be sensed and/or identified based on locations and motion sensed by sensors of the mobile devices of the electronic message recipients.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the electronic message recipient actions of the first template of the electronic message and the second template of the electronic message.

As previously described, the described embodiments solve practical problems associated with automatically generating by a server or computing apparatus electronic messages that are likely to solicit a response from recipients (sub-users) of the electronic messages. Further, the described embodiments further solve practical problems associated with automatically identifying messages and characteristics (including a behavior) of messages that are more or less likely to solicit the response from the recipients (sub-users). Further, the described embodiments further solve practical problems associated with tuning the generation and other characteristics of the electronic messages based on preferences and actions of users who input a description for the electronic messages and based on tracking and monitoring the actions of recipients (sub-users) of the electronic messages. The different electronic messages may include different content and/or behavior. For an embodiment, the behavior can include the behavior of the display of the different electronic messages being different. For example, the display of different electronic messages may include motion of the display of the electronic messages. Accordingly, based on the sensed behavior of recipients of the electronic messages, the display may selectively vary. As shown in FIG. 14, the different behaviors of the electronic messages can include different motion and/or placement of features within a display of the electronic messages. For example, a selectable button within the display of the electronic messages can be located on the displays of the electronic messages based on the tracked actions and responses of the sub-users upon receiving the electronic messages. Locations and motions of the features of the displayed electronic messages can be adjusted based on the evaluated success of electronic messages having different locations and motion. Clearly other features, such as, text size, text location, text motion, fonts, colors, can additionally or alternatively be selected.

Although specific embodiments have been described and illustrated, the embodiments are not to be limited to the specific forms or arrangements of parts so described and illustrated. The described embodiments are to only be limited by the claims.

What is claimed:

1. An apparatus, comprising:
   a segmentation server;
   a user server connected through a network to the segmentation server;
   a plurality of sub-user computing devices connected through the network to the user server and the segmentation server;
   wherein the segmentation server is configured to:
      a. receive a segmentation description from a user of the user server;
      b. retrieve user data from a database;
      c. translate the segmentation description to a standardized segmentation system vernacular based on the segmentation description and the retrieved user data;
      d. identify a set of individual criteria contained within the standardized segmentation description vernacular mapped to variable names;
      e. express the standardized segmentation system vernacular as a logical statement in terms of the variable names;
      f. parse each individual criteria of the set of individual criteria against sub-user data of the user data of the database in parallel yielding a representation of each criteria of the set of individual criteria;

g. identify sub-users of a segment by logically combining the representation of each criteria according to the logical statement; and h. perform an electronic action directed to the sub-users identified by the segment, comprising:

loading user-tracking code to a browser of each of the sub-users when each of the sub-users loads a webpage of the user;

sending electronic messages to each of the sub-users identified by the segment, wherein different electronic messages include a display having a different behavior;

sensing, by the user-tracking code, actions of each of the sub-users in response to receiving the electronic messages; and adjusting the different behavior of the display of the different electronic messages based on the sensed actions to improve a user interface of the display of the sub-users.

2. The apparatus of claim 1, wherein the segmentation server is further configured to:

create suggested segment descriptions;

display the suggested segment descriptions;

wherein the segment description received from the user is based on the suggested segment descriptions.

3. The apparatus of claim 1, wherein the segmentation server is further configured to:

compare list names and metrics called out in the segmentation description against the metrics and information retrieved from the user data to find a best match for each;

wherein the best matches for each of the list name and metrics are translated to the standardized segmentation system vernacular based on the segmentation description and the retrieved user data.

4. The apparatus of claim 1, wherein the segmentation server is further configured to:

display the standardized segmentation system vernacular to the user;

sense user actions by the user;

feed the sensed user actions back to a translator that performs the translation.

5. The apparatus of claim 1, wherein the yielded representation of each criteria of the set of individual criteria is a JSON (JavaScript object syntax) object.

6. The apparatus of 1, further comprising adjusting future translations based on the sensed actions.

7. The apparatus of 1, further comprising adjusting parsing of future individual criteria based on the sensed actions.

8. The apparatus of claim 1, wherein the segmentation server is further configured to:

generate two or more versions of identified sub-users of two of more segmentation versions based on two or more versions of the standardized segmentation system vernacular;

electronically send electronic messages to the two or more versions of identified sub-users;

monitor actions of the two or more versions of identified sub-users based on responses to receiving the electronic messages; and rank the two or more versions of the standardized segmentation system vernacular based on the monitored actions.

9. The apparatus of claim 8, wherein the segmentation server is further configured to train future translations of segmentation descriptions to the standardized segmentation system vernacular based on the rankings of the two or more versions of the standardized segmentation system vernacular.

10. The apparatus of claim 8, wherein the segmentation server is further configured to train future parsing based on the rankings of the two or more versions of the standardized segmentation system vernacular.

11. The apparatus of claim 1, wherein the electronic messages are electronically generated based on message inputs of the user, and further comprising tuning the generation of the electronic messages based on sensing actions of the user and based on sensing actions of the sub-user in response to electronically receiving the electronic message.

12. The apparatus of claim 1, further comprising:

selecting one or more send times for the electronic messages; and adjusting send times for future generated electronic messages based on sensed actions of the sub-users in response to receiving the electronic messages.

13. The apparatus of claim 1, wherein a selectable button is located on the display of the electronic messages based on the sensed actions.

14. A method, comprising:

receiving a segmentation description from a user of the user server;

retrieving user data from a database;

translating the segmentation description to a standardized segmentation system vernacular based on the segmentation description and the retrieved user data;

identifying a set of individual criteria contained within the standardized segmentation description vernacular mapped to variable names;

expressing the standardized segmentation system vernacular as a logical statement in terms of the variable names;

parsing each individual criteria of the set of individual criteria against sub-user data of the user data of the database in parallel yielding a representation of each criteria of the set of individual criteria;

identifying sub-users of a segment by logically combining the representation of each criteria according to the logical statement; and performing an electronic action directed to the sub-users identified by the segment, comprising:

loading user-tracking code to a browser of each of the sub-users when each of the sub-users loads a webpage of the user;

sending electronic messages to each of the sub-users identified by the segment, wherein different electronic messages include a display having a different behavior;

sensing, by the user-tracking code, actions of each of the sub-users in response to receiving the electronic messages; and adjusting the different behavior of the display of the different electronic messages based on the sensed actions to improve a user interface of the display of the sub-users.

15. The method of claim 14, further comprising:

displaying the standardized segmentation system vernacular to the user;

sensing user actions by the user;

feeding the sensed user actions back to a translator that performs the translation;

training the translator with the sensed user action for future translations.

16. The method of claim 14, further comprising:
adjusting future translations based on the sensed actions.

17. The method of claim 14, further comprising:
adjusting parsing of future individual criteria based on the
   sensed actions.

18. The method of claim 14, further comprising adjusting
future translations based on the sensed actions.

19. The method of claim 14, further comprising adjusting
parsing of future individual criteria based on the sensed
actions.

20. The method of claim 14, wherein the electronic
messages are electronically generated based on message
inputs of the user, and further comprising tuning the gen-
eration of the electronic messages based on sensing actions
of the user and based on sensing actions of the sub-user in
response to electronically receiving the electronic message.

\*    \*    \*    \*    \*